United States Patent [19]

Asano et al.

[11] Patent Number: 4,819,095

[45] Date of Patent: Apr. 4, 1989

[54] METHOD OF CONTROLLING A DISK HEAD POSITION BY INDIVIDUALLY TIMING ZONES SERVO INFORMATION

[75] Inventors: Isao Asano; Shoichiro Saito, both of Furukawa; Tooru Kaneko, Miyagi; Toru Kowaguchi, Furukawa; Tetsuya Mitsuishi, Furukawa; Hiroshi Yoshida, Furukawa, all of Japan

[73] Assignee: Alps Electric Co., Ltd., Japan

[21] Appl. No.: 57,256

[22] Filed: May 29, 1987

[30] Foreign Application Priority Data

| Jun. 4, 1986 | [JP] | Japan | 61-128223 |
| Jun. 18, 1986 | [JP] | Japan | 61-140351 |
| Jun. 24, 1986 | [JP] | Japan | 61-146244 |
| Jun. 30, 1986 | [JP] | Japan | 61-151387 |
| Jun. 30, 1986 | [JP] | Japan | 61-151388 |
| Aug. 12, 1986 | [JP] | Japan | 61-187840 |
| Dec. 10, 1986 | [JP] | Japan | 61-292607 |
| Dec. 16, 1986 | [JP] | Japan | 61-297713 |

[51] Int. Cl.[4] .......................................... G11B 5/596
[52] U.S. Cl. ............................ 360/77.04; 360/78.04
[58] Field of Search ........................ 360/77, 78, 75

[56] References Cited

U.S. PATENT DOCUMENTS

| Re. 32,075 | 1/1986 | Harrison et al. | 360/77 |
| 3,412,386 | 11/1968 | Handley et al. | 360/77 |
| 4,122,503 | 10/1978 | Allan | 360/78 |
| 4,136,365 | 1/1979 | Chick et al. | 360/78 |
| 4,149,199 | 4/1979 | Chick et al. | 360/77 |
| 4,157,577 | 6/1979 | Porter, Jr. et al. | 360/77 |
| 4,380,033 | 4/1983 | Bacrania | 360/77 |
| 4,455,583 | 6/1984 | Schultz | 360/78 |
| 4,524,397 | 6/1985 | Chalmers et al. | 360/77 |

OTHER PUBLICATIONS

IBM Technical Disclosure Bulletin, vol. 17, No. 6, Nov. 1974, "Correction of Data Track Misregistration in Servo Controlled Disk Files", A. Paton, pp. 1781–1783.
IBM Technical Disclosure Bulletin, vol. 19, No. 6, Nov. 1976, "Self-Calibrating Disk Storage Apparatus", D. E. Griffiths and H. E. Van Winkle, pp. 1991–1992.

Primary Examiner—Alan Faber
Assistant Examiner—David L. Robertson
Attorney, Agent, or Firm—Guy W. Shoup; Paul J. Winters

[57] ABSTRACT

An information recording disk driving device includes an information recording disk having servo tracks formed at predetermined regions which include servo information. The driving device is configured to move a head assembly from a recording track for signal writing or reading to an associated one of the servo tracks in response to a servo information supplied at a predetermined time. An instruction from a controller or an instruction from a host computer to read the servo information from the servo track subsequently place the head assembly at the fine track position of the original recording track according to the detected servo information.

3 Claims, 25 Drawing Sheets

FIG. 3
(a)
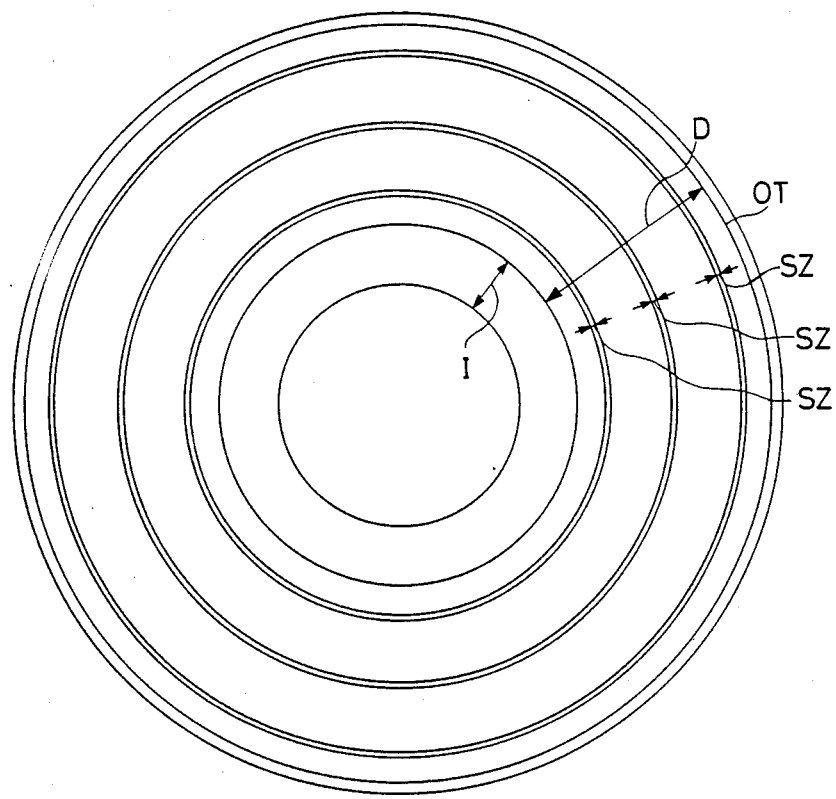
(b)
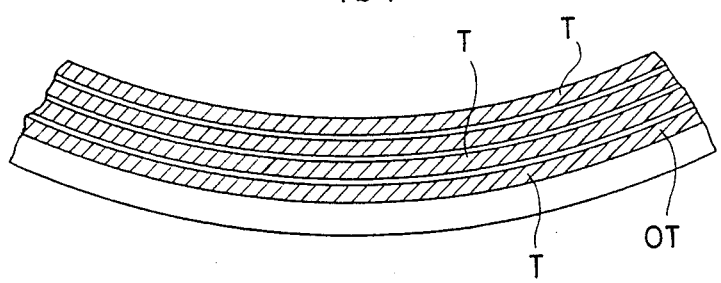

of the prior art system are designated by the same reference numerals.

In FIG. 1, the control system of the disk driving device controls a DD motor 3 for rotating a magnetic disk 1 and controls a stepping motor 11 for swinging a swing arm 8. The control system comprises a driving circuit 22 for signal transmission and reception with respect to a head amplifier 21, a servo circuit 23 which processes servo information detected by the magnetic head and amplified by the head amplifier 21 to supply the driving circuit 22 with an electric signal concerning a servo control, and a controller 25 which controls the driving circuit 22 via an interface 24. The controller 25 is connected to a host computer 26 by a bus 27 to enable signal processing of a signal detected by the magnetic head 2 or a signal to be transmitted to the magnetic head 2.

FIG. 3(a) shows various areas provided on the magnetic disk 1, and FIG. 3(b) shows an arrangement of recording tracks. The magnetic disk 1 may be made from an aluminum plate having a magnetic coating. The magnetic disk 1 has an inhibit zone I and a data zone D. The inhibit zone I is located at a radially inner position thereof, and no data is written thereon. The data zone D is located at a radially outer position thereof has about six hundred recording tracks T including the outermost zero track OT. The magnetic disk further includes a servo zone SZ at a position radially outward of the data zone D.

The servo zone SZ best shown in FIG. 2 consists of four servo tracks ST1, ST2, ST3 and ST4 on each of which servo signals F are written in a zigzag configuration and symmetrically about a center line 0 in the length direction. The zigzag servo signals are spaced by a predetermined interval in the circumferential direction. This is a track center line servo control data.

The width of the recording tracks T and servo tracks ST1 through ST4 coincides with the length of a gap G of the magnetic head 2. An off-track phenomenum occurs when the position of the gap G deviates from a desired recording track T.

With this arrangement, the disk driving system operates as follows.

In this type of disk driving system, a relatively large temperature variation occurs between its dormant and activated conditions. In this connection, immediately after a power is supplied to the disk driving device, the magnetic head 2 first scans the surface of the magnetic disk 1 to memorize in the RAM of the driving circuit 22 the electrical amount concerning exciting phases of the stepping motor 11 corresponding to respective recording tracks T, and thereby makes the RAM table. Additionally, a positioning correction system considering an increase of the temperature is originally stored in a microcomputer so that recording or reproduction is normally performed in accordance with the servo algorithm stored in the microcomputer. More specifically, if the microcomputer gives the driving circuit 22 a servo instruction according to the aforegoing servo algorithm while recording or reproduction of a desired recording track is performed by energization of a predetermined exciting phase in accordance with the RAM table, the magnetic head 2 is moved from a recording track T1, for example, to a servo track ST1, for example, in the same exciting phase as the recording track T1 and in a servo zone SZ nearest to the recording track T1. If the magnetic head 2 is heretofore located at the recording track T2, it is moved to the servo track ST2 of FIG. 2.

Similarly, if the recording track is T3 or T4, the servo track will be ST3 or ST4, respectively. In this embodiment, one cycle of the stepping motor 11 consists of four steps. Therefore, one servo zone SZ has four servo tracks, corresponding to the number of steps per one cycle of the stepping motor 11. When other form of the stepping motor 11 or other control system is employed, the number of servo tracks will be changed accordingly.

Assuming that the same exciting phase is excited by the same voltage value, and the gap G of the magnetic head 2 located in position A in FIG. 2(b) detects a servo signal F, a difference arises between the level of a precedingly detected servo signal and the level of a subsequently detected servo signal. In this connection, sample holding circuits 28 and 29 (FIG. 4) of the servo circuit 23 discriminate the signals, and a comparator 30 compares their signal levels. A servo amplifier 31 determines a voltage value for application to the exciting phase of the stepping motor 11 in accordance with the comparison result to control the stepping motor 11 via the driving circuit 22. In this fashion, the gap G of the magnetic head 2 is moved to position B (FIG. 2(b)) which is symmetrical about the center line 0, and a fine track position is fixed with respect to the servo track ST1.

The voltage value at this time is stored in the RAM of the driving circuit 22, so that the magnetic head 2 returns to its original recording track T1, referring to the RAM table, and the voltage value stored in the RAM determines the position of the gap G with respect to the recording track T1. In this fashion, the fine track of the recording track T1 is also established.

The aforegoing RAM table is renewed upon an increase of the temperature or with time by an instruction from a host computer or controller. In this renewal, fine track position information about the servo tracks ST2, ST3 and ST4 is obtained in addition to the aforegoing voltage value for the servo track ST1, and the RAM stores these four current values to be supplied to the exciting phases of the stepping motor associated with four servo tracks respectively. After the renewal, the servo control is performed in accordance with the stored voltage values. Therefore, positional fixture of the head is controlled by renewed data to ensure the best recording or reproducing operation. In the aforegoing embodiment, the recording medium driving device moves the head assembly from a recording track to a servo track when desired, and controls a motor used as a drive means of the head driving mechanism so that the head takes the fine track position on the servo track. Additionally, the system moves the head assembly back to the original recording track, and precisely place the head assembly at the fine track position of the recording track according to motor control information about the fine track position of the servo track.

More specifically, the exciting voltage value of the motor on arrival of the head at the fine track position of the servo track is stored, and maintained when and after the head assembly is returned to its original position, so that the head takes the fine track position also in the recording track according to the stored data. By effecting this operation from time to time when desired, the off-track problem never occurs, and good recording or reproduction is performed at all times.

As described, the embodiment uses servo tracks provided on the information recording medium and having servo information written thereon, and is configured to bring the head assembly to the servo tracks at any desired time, so as to place the head assembly at the fine track position of a servo track under a servo control based on servo information and use the positioning information obtained here to return the head assembly to its preceding position and place it at at the fine track position of the recording track. Therefore, by reading servo information when desired, the head assembly is placed at a precise track position. This decreases useless time upon head positioning. At the same time, since no slow-down in the revolution of the information recording medium is required for the written servo information, it prevents an increase of the error rate and hence ensures a more reliably recording or reproducing operation.

[SECOND EMBODIMENT]

A second embodiment of the invention is explained below.

The disk driving device according to the second embodiment uses servo tracks provided at limited track positions on an information recording medium and having a predetermined pieces of servo information written thereon in a relationship with an interior index, and is configured to move a head assembly upon signal writing or reading from a recording track for the signal writing or reading to an associated servo track to read servo information. The detected servo information is used to control a driving voltage to be supplied to a head assembly transport motor to place the head assembly at the fine track position of the servo track. After this, the head assembly is returned to its preceding position and placed at the fine track position in the recording track according to the positioning information of the preceding positional fixture in the servo track. The servo information in the second embodiment is related to an interior index which in turn is related to a format.

FIGS. 5, 6 and 7 illustrate a disk driving device according to the second embodiment, in which FIG. 5 shows recording tracks of a magnetic disk and a servo signal writing condition, FIG. 6 shows various regions on the magnetic disk, and FIG. 7 is a bottom view of the disk driving device for explanation of its index detection. The disk driving device itself is the same as the prior art device of FIG. 27, and its control arrangement is equal to that of the first embodiment. In the following explanation, members or parts which are or may be regarded to be equal to those of the prior art device and the first embodiment are designated by the same reference numerals.

FIG. 6 shows servo tracks formed on the magnetic disk 1 and a configuration of recording tracks not provided with servo information. The magnetic disk 1 may be made of an aluminum plate having a magnetic coating, and includes an inhibit zone I and a data zone D. The inhibit zone is located at the radially innermost position, and no data is written thereon. The data zone D is located radially outwardly of the inhibit zone I, and has about six hundred recording tracks T aligned concentrically. The data zone D is divided into three sections each having a group of servo tracks in which four tracks as shown in FIG. 5 form one group. The servo track groups are a servo track group OST at an outer circumferential portion, a servo track group MST at an intermediate portion and a servo track group IST at an inner circumferential portion. In individual servo track groups OST, MST and IST, servo zones OSZ1, OSZ2, MSZ1, MSZ2, ISZ1 and ISZ2 are provided on which servo signals F are written as servo information at 180 degrees interval.

FIG. 5 shows a servo track group MST provided at an intermediate portion, among others. The servo track group MST includes four servo tracks MST1, MST2, MST3 and MST4 on each of which servo signals F are written alternatingly at a uniform frequency and in a zigzag configuration at positions equally distant from a center line C in the length (circumferential) direction, in a relationship with first and second interior index signals IN1 and IN2. They correspond to the aforegoing servo zones MSZ1 and MSZ2. In this case, since the servo signals F are written by a single magnetic head 2, the widths of the servo signals F, recording tracks T and servo tracks MST1 through MST4 coincide with the length of a gap G of the magnetic head 2. An off-track phenomenum occurs when the position of the gap G of the magnetic head 2 deviates from a desired recording track T.

In this embodiment, 180 degrees phase difference is provided in each pair of servo zones OSZ1 and OSZ2, MSZ1 and MSZ2, and ISZ1 and ISZ2, considering the time required for positional correction of the magnetic head 2 and the time required for one revolution of the magnetic disk 1. More specifically, the time required for one revolution of the magnetic disk 1 is about 16.67 msec at 3600 rpm, and the time from energization to deenergization of the stepping motor 11 is about 8 msec. Therefore, with the 180-degree phase difference in the servo zones, it is possible to correct the position of the magnetic head by detecting servo signals F in the servo zones OSZ1, MSZ1 and ISZ1 associated with the first interior index signal IN1, for example, and immediately after the termination of the correcting operation, it is possible to confirm whether the correcting operation is adequate or not, by detecting servo signals F in the servo zones OSZ2, MSZ2 and ISZ2 associated with the second interior index signal IN2. In this case, since the time for one revolution of the magnetic disk 1 has the aforegoing relationship with the energized duration of the stepping motor 11, two servo zones are provided in one cycle at 180 degrees interval. However, they may be modified according to the time of the positioning motion by an employed stepping motor 11 or other driving motor and the revolution of an employed recording medium. Whichever motor or recording medium is employed, the system will sufficiently function by providing one to several servo zones per cycle.

Further, in the disk driving device, since the servo zones OSZ1, OSZ2, MSZ1, MSZ2, ISZ1 and ISZ2 are formed at 180 degrees interval, the same phase difference is also required in the first and second interior index signals IN1 and IN2. In this connection, as shown in FIG. 5, for example, a magnet 40 (hereinafter called "PG magnet") serving as a pulse generating means is provided at an outer circumferential portion of a rotor 3a of the DD motor 3, so that a magnetic change from the PG magnet 40 is detected by coils, Hall elements, or other detecting means 41a and 41b (hereinafter called "PG sensor"), for example, provided near the outer circumferential portion of the rotor 3a of the DD motor 3 and symmetrically opposed to each other about the rotation axis of the DD motor 3, in order to use detection pulses as the first and second interior index signals IN1 and IN2.

Four servo tracks form one group for the reason explained below.

METHOD OF CONTROLLING A DISK HEAD POSITION BY INDIVIDUALLY TIMING ZONES SERVO INFORMATION

FIELD OF THE INVENTION

This invention relates to an information recording disk driving device which records and/or reproduces information by rotating an information recording medium in the form of a disk, and also relates to a servo control method of positioning its head assembly to establish a reliable tracing of a head assembly with respect to a recording track in the information recording disk driving device.

BACKGROUND OF THE INVENTION

There are known various forms of disk driving device configured to record and/or reproduce information by rotating a magnetic recording medium in the form of a disk (hereinafter called a magnetic disk), for example. Among others, a disk driving device also called "hard disk device" is particularly used in a small-scaled, large-capacity system. Such a hard disk device is configured to rotate at a high revolution a magnetic disk which is made of a disk-shaped hard material having magnetic recording layers on surfaces thereof, and a magnetic head is opposed to the surface of the magnetic disk to effect signal recording or reproduction.

FIG. 27 shows one form of the disk driving device of this type. The disk driving device generally comprises a magnetic disk 1 on which information is recorded, a magnetic head 2 which records or reproduces information on or from the magnetic disk 1, a direct drive motor (not shown. Hereinafter called "DD motor") which drives the magnetic disk 1, a head driving mechanism 4 which moves the magnetic head 2 to a predetermined track on the magnetic disk 1, a base plate 5 which supports a housing sealingly accepting therein the magnetic disk 1, the magnetic head 2 and other members, a printed board 6 on which a motor driving circuit, control circuit, etc. are printed, and a frame (not shown) which positions the printed board 6 on the base plate 5.

The illustrated magnetic disk device includes two magnetic disks 1. Each magnetic disk 1 has two recording surfaces on opposite planar surfaces thereof. Therefore, the illustrated disk mechanism includes four magnetic heads 2 associated with respective recording surfaces of the magnetic disks 1. The magnetic heads are mounted to a swing arm 8 of the head driving mechanism 4 by cantilever springs. The head driving mechanism 4 consists of the swing arm 8, a steel belt 9 mounted to a part of the swing arm 8, a pulley 10 on which an intermediate portion of the steel belt engages, and a stepping motor 11 which has a drive shaft 12 supporting the pulley 10 combined with the steel belt 9, so that when the stepping motor 11 is driven, the swing arm 8 swings about a pivot pin 8a thereof. The magnetic disks 1, magnetic heads 2, swing arm 8, steel belt 9 and pulley 10 are accepted in the casing which consists of the base plate 5 and a top cover (not shown). To establish an airtight sealing of the housing, gaskets are used at the contact between the base plate 5 and the top cover and at the mounting portion of the stepping motor 11. Further, magnetic fluid is applied around the shaft of the DD motor for the same purpose. The swing arm 8 is provided with a shutter 17 extending outwardly away from the magnetic heads 2. Nearer to an airtight chamber of the base plate 5 is provided a photo interrupter 18 serving as an outside sensor. The photo interrupter 18 defines an insertion path 18a which receives the shutter 17 loosely. In the prior art arrangement, when the magnetic head 2 reaches the zero track position at the outer-most circumference, the shutter 17 blocks the light path provided in the insertion path 18a of the photo interrupter 18.

In the arrangement using the stepping motor 11 to transport the magnetic head 2, head positioning is difficult when the track density of the disk is increased. More specifically, since different materials in the hard disk apparatus have different expansion coefficients, there occurs a problem called "thermal off-track" in which the position of the magnetic head 2 relative to the tracks varies with temperature. Therefore, in a 5.25 inch-type hard disk apparatus, it is difficult to precisely position the magnetic head 2 beyond 400TPI unless a servo system is used.

U.S. Pat. No. Re. 32,075 discloses an invention of a servo-control system. The system uses a data-masked servo sector including track center line servo-control data detected by a head to fix the position of the head according to one piece of servo information per one revolution of a magnetic disk. Since this servo-control system invites a decrease in the data recording length by an amount corresponding to the servo information, it is configured to slightly slow down the revolution to adjust the head transport speed. This arrangement, however, sometimes invites an instable movement of the head and sometimes increases the error rate.

U.S. Pat. No. 4,122,503 discloses another control system using a servo system in which the inner-most and outer-most tracks are used as particular servo tracks. This system is called "ID-OD system" in abbreviation of "inner diameter" and "outer diameter". In this system, the disk apparatus is configured to first read the outer servo track and effect a fine adjustment to place the head at the center of the track. Subsequently, the head is moved toward the inner servo track. In this operation, the step pulses of the stepping motor in the head driving mechanism are counted, so that when the head reaches the inner servo track, the head positioning mechanism effects a precise positioning to place the head at the center of the track. While the precise positioning is effected for each servo track, the positioning mechanism is informed of a correction amount necessary for finding the center of the track. Obtaining the correction amount, the positioning mechanism is enabled to correct precise positions of respective tracks according to information about the number of step pulses required for movement between the outer and inner tracks and the fine step correction amount required in each servo track.

However, since the positioning mechanism in this system must repeat the correction process on every occurrence of a positioning error, it takes much time not directly contributing to recording and reproducing operation when the positioning error often occurs, and decreases the utility of the disk driving apparatus. Further, since the mechanism does not include any means for re-adjusting the head once positioned on the data track, it cannot ensure that the head is maintained at a proper position.

OBJECT OF THE INVENTION

It is therefore an object of the invention to provide an information recording disk driving device capable of effectively driving a disk, not taking much time which does not contribute to recording and reproducing operation.

A further object of the invention is to provide a novel pattern of servo information on an information recording disk.

A still further object of the invention is to provide an information recording disk driving device having a simple arrangement to relate servo information with a servo control.

A yet further object of the invention is to provide an information recording disk driving device never erasing servo information upon a mis-track during formatting as will be clarified from the subsequent description.

A yet further object of the invention is to provide a head positioning control method using servo information written on the information recording disk in the above-proposed information recording disk driving device to fix the position of a head assembly.

A yet further object of the invention is to provide an information recording disk driving device in which a servo seek time is decreased, and the decrease of the recording tracks caused by the use of servo tracks is minimized.

A yet further object of the invention is to provide a head positioning control method to ensure interchangeability of an information recording disk driving system against any driving unit or controller when the aforegoing servo track is used.

A yet further object of the invention is to provide a head positioning control method to ensure a total servo algorithm concerning a servo correction for fixing the position of a head in an information recording disk driving device, i.e. an effective, always appropriate head position control.

A yet further object of the invention is to provide a renewal system to ensure an effective renewal of a RAM table for storing information about center positions of tracks which is required for a servo correction.

DISCLOSURE OF THE INVENTION

In the present invention, these purposes, as well as other which will be apparent, are achieved generally by providing an information recording disk driving device including an information recording disk having servo tracks formed at predetermined regions on which servo information is written. The disk driving device is configured to move a head assembly from a recording track for signal writing or reading to an associated servo track. The head assembly is moved to the associated servo track in response to servo information supplied at a predetermined time. An instruction from a controller or a host computer read the servo information from the servo track and place the head assembly at the fine track position of the original recording track according to the detected servo information.

Other objects, aspects, features and advantages of the present invention will be apparent when the detailed description of the preferred embodiments of the invention are considered in conjunction with the drawings which should be construed in an illustrative and not limiting sense, as follows:

BRIEF DESCRIPTION OF THE DRAWINGS

FIGS. 1 through 4 illustrate a first embodiment of the invention in which FIG. 1 is a block diagram of a control arrangement of a disk driving device, FIG. 2 shows a conceptive arrangement of servo tracks, FIG. 3(a) shows various areas on a magnetic disk, FIG. 3(b) is a fragmentary enlarged view of the magnetic disk, and FIG. 4 is a block diagram of a servo circuit;

FIGS. 5 through 7 illustrate a disk driving device according to a second embodiment of the invention, in which FIG. 5 shows a conceptive arrangement of servo tracks and recording tracks, FIG. 6 shows various regions on a magnetic disk, and FIG. 7 is a bottom view of the disk driving device;

FIGS. 8 through 10 are views for explanation of a disk driving device according to a third embodiment of the invention, in which FIG. 8 is a bottom view of the disk driving device, FIG. 9 shows a conceptive arrangement of servo tracks and recording tracks, and FIG. 10 shows various regions on a magnetic disk;

FIGS. 11 through 15 are views for explanation of a disk driving device according to a fourth embodiment of the invention, in which FIG. 11 shows a conceptive arrangement of servo tracks and recording tracks, FIG. 12 is a block diagram of a control system of the disk driving device, FIG. 13 shows various regions on a magnetic disk, FIG. 14 is a block diagram of a servo circuit, and FIG. 15 is a bottom view of the disk driving device;

FIGS. 16 through 19 are views for explanation of a disk driving device according to a fifth embodiment of the invention, in which FIG. 16 shows a conceptive arrangement of servo tracks and recording tracks, FIG. 17 shows various regions on the magnetic disk, FIG. 18 shows a modified conceptive arrangement of servo tracks and recording tracks, and FIG. 19 shows various regions on a magnetic disk in the modified arrangement;

FIGS. 20 and 21 are views for explanation of a sixth embodiment of the invention, in which FIG. 20 is a flow chart showing its control process, and FIG. 21 shows one example of format;

FIGS. 22 through 26 are views for explanation of a seventh embodiment of the invention, in which FIG. 22 is a flow chart of its servo correction process, FIG. 23 shows real experimental amounts of thermal off-track, FIG. 24 is an explanatory view showing servo correction intervals, FIG. 25 is a flow chart of its control process during head seeking, and FIG. 26 shows a relationship between exciting phases of a stepping motor and positions of tracks;

DETAILED DESCRIPTION

Figure 1:
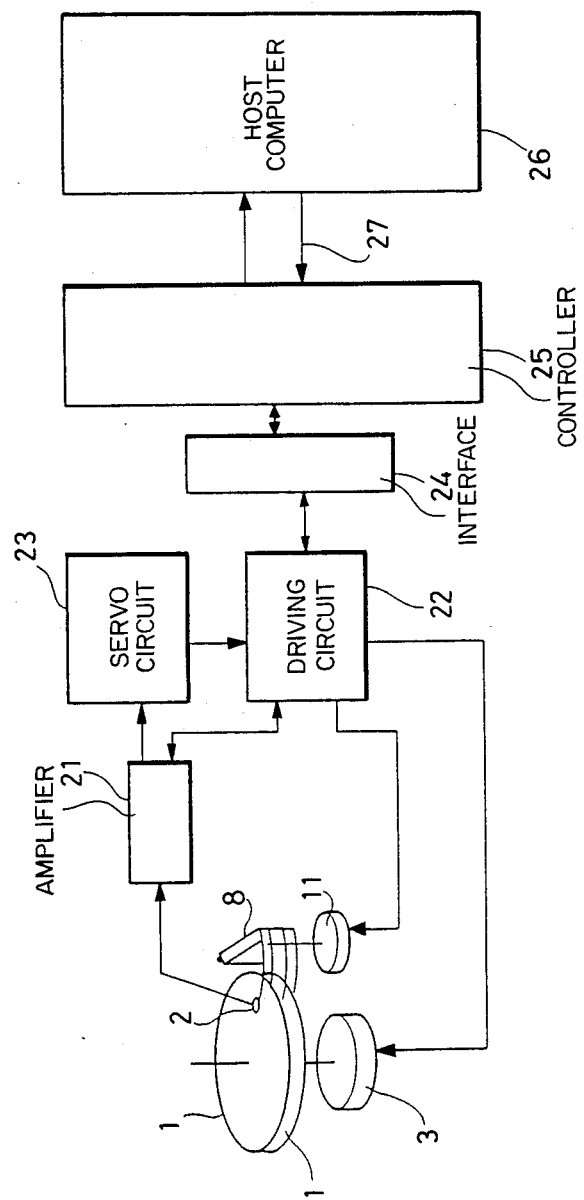

The invention is hereinbelow described in detail, referring to preferred embodiments illustrated in the drawings.

[FIRST EMBODIMENT]

Figure 2:
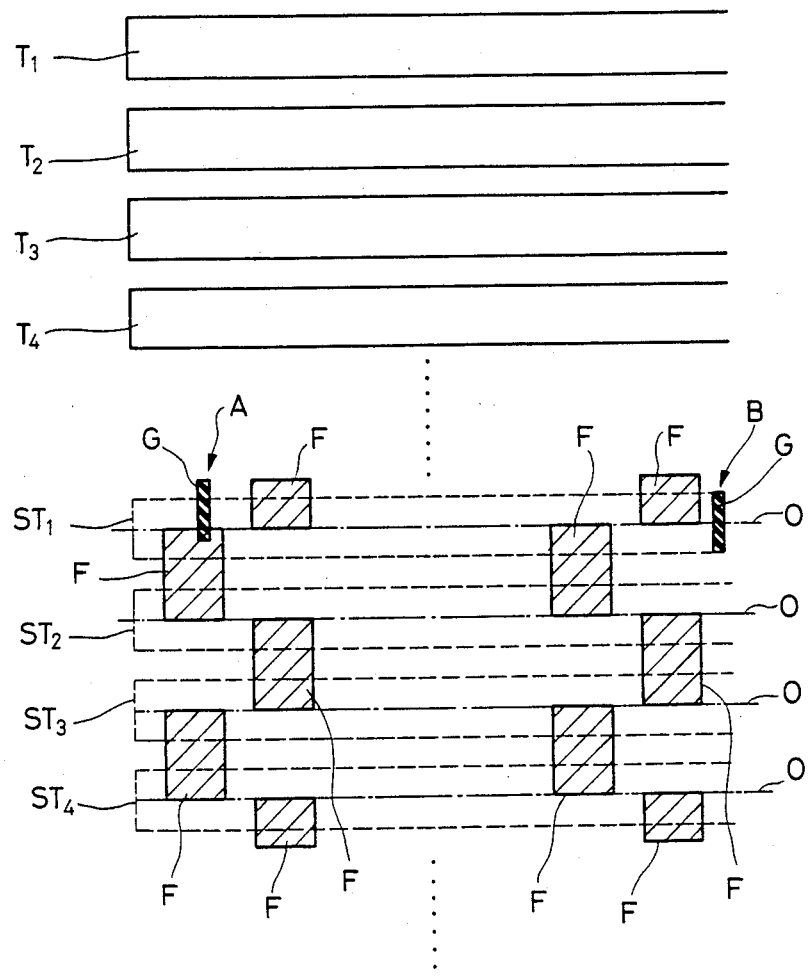
Figure 4:
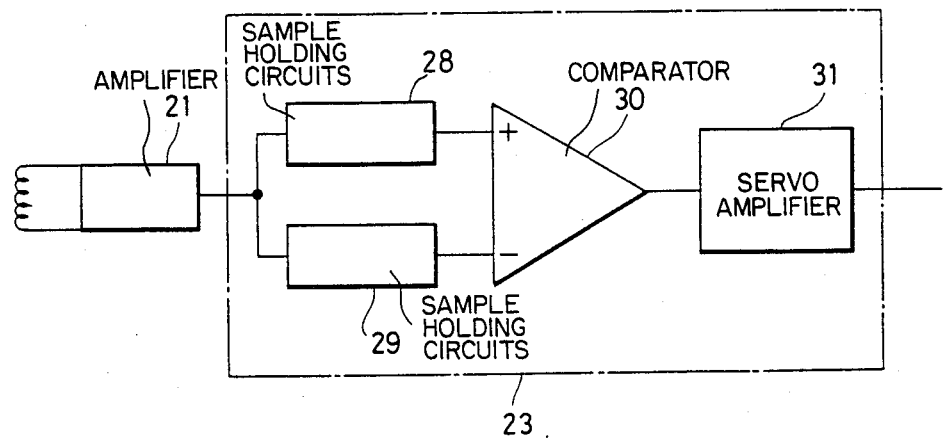

FIGS. 1 through 4 illustrate a first embodiment of the invention in which FIG. 1 is a block diagram of a control arrangement of a disk driving device, FIG. 2 shows recording tracks and servo tracks on a magnetic disk, FIG. 3(a) shows various areas on the magnetic disk, FIG. 3(b) is a fragmentary enlarged view of the magnetic disk, and FIG. 4 is a block diagram of a servo circuit. The disk driving device itself is the same as the prior art system of FIG. 27, and some members which are or may be regarded to be substantially equal to those In the stepping motor 11, rotating angles in individual steps are not completely uniform due to presence of errors in distances between magnetic pole teeth or between magnetized portions of the rotor. Therefore, when a stepping motor of four-phase unipolar type or two-phase bipolar type is used, one cycle is established by eight steps totaling four steps in one-phase excitation and four steps in two-phase excitation. It is recognized that errors in the rotation angles by the exciting phases in individual half revolutions represent a uniform pattern. Therefore, by configuring to correct the rotating angles of four tracks in a half cycle, maintaining a close relationship between the rotating angle and an exciting voltage, the same control factor also applies to every other four recording tracks.

Figure 5:
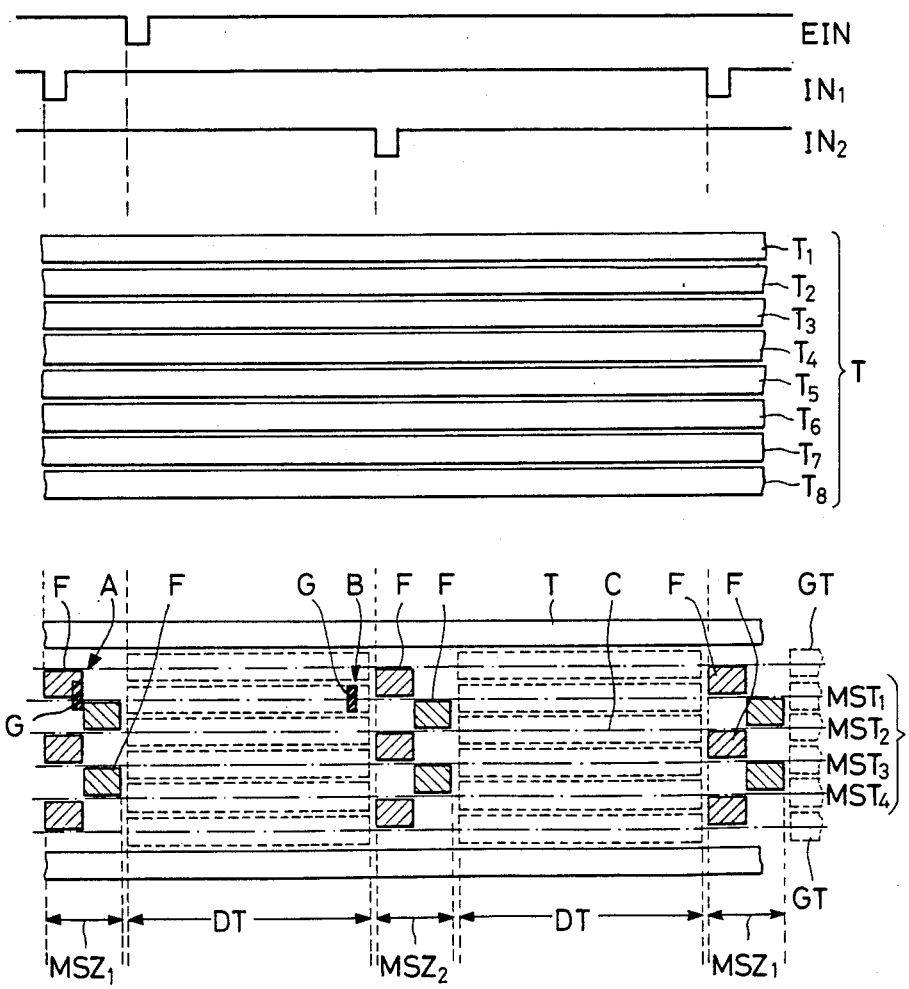

FIG. 5 also shows guard tracks GT provided radially inward and outward of the group of servo tracks MST. Individual guard tracks GT and servo tracks MST1 through MST4 include dummy tracks DT having no servo signal F recorded thereon and never used as a data region. In FIG. 5, reference symbol EIN denotes an exterior index signal. When the first index signal IN1 is detected, counting is commenced, and when a predetermined counting number is detected, the exterior index signal EIN is transmitted to the host computer 26. The exterior index signal EIN is used as an index of writing or reading of the recording tracks T in the data zone D.

With this arrangement, the disk driving device operates as follows.

Immediately after a power is entered in the disk driving device, the magnetic head 2 first scans the surface of the magnetic disk 1 to memorize in the RAM of the driving circuit 22 the electrical amount concerning exciting phase of the stepping motor 11 corresponding to respective recording tracks T, and thereby makes the RAM table. Additionally, a positioning correction system considering an increase in the temperature is originally stored in a microcomputer so that recording or reproduction is normally performed in accordance with the servo algorithm stored in the microcomputer. More specifically, if the microcomputer gives the driving circuit 22 a servo instruction based on the aforegoing servo algorithm while recording or reproduction of a desired recording track is performed by energization of a predetermined exciting phase indicated by the RAM table, the magnetic head 2 is moved from a recording track T1 (or T5), for example, to a servo track MST1, for example, in the same exciting phase as the recording track T1 and in a servo zone MST nearest to the recording track T1 (T5). If the magnetic head 2 is heretofore located at the recording track T2 (or T6), it is moved to the servo track MST2 of FIG. 5. Similarly, if the recording track is T3 (T7) or T4 (T8), the servo track will be MST3 or MST4, respectively. In this embodiment, one cycle of the stepping motor 11 consists of eight steps. Therefore, one servo zone has four tracks corresponding to the number of steps per half cycle of the stepping motor 11. When other form of the stepping motor 11 or other control system is employed, the number of servo tracks will be changed accordingly.

Assuming that the same exciting phase is energized by the same voltage value, and the gap G of the magnetic head 2 located at position A in FIG. 5 detects a servo signal F, a difference arises between the level of a precedingly detected servo signal and the level of a subsequently detected servo signal. In this connection, sample holding circuits 28 and 29 (FIG. 4) of the servo circuit 23 discriminate the signals, and a comparator 30 compares their signal levels. A servo amplifier 31 determines a voltage value for application to the exciting phase member of the stepping motor 11 in accordance with the comparison result to control the stepping motor 11 via the driving circuit 22. In this fashion, the gap G of the magnetic head 2 is moved to position B (FIG. 2(b)) which is symmetrical about the center line 0, and the fine track position is fixed with respect to the servo track MST1.

Immediately after the movement of the magnetic head 2 is terminated, a servo signal F in the second servo zone MSZ2 is detected for the aforegoing reason to judge whether the movement is adequate or not. More specifically, if an output from the comparator circuit 30 in the second servo zone MSZ2 is lower than a predetermined level, the present movement condition is maintained. However, if the output is higher than the predetermined level, the stepping motor 11 is driven again to effect the same positional control to bring the magnetic head 2 to a precise track position, i.e. the fine track position.

A voltage value applied to an exciting phase of the stepping motor 11 at arrival to the fine track position is stored in the RAM of the driving circuit 22, and the magnetic head 2 returns to its original track T1, referring to the aforegoing RAM table, so that the position of the gap G with respect to the recording track T1 is fixed by the voltage value stored in the RAM. In this fashion, the fine track position is established also in the recording track T1.

The described embodiment uses three groups of servo tracks OST, MST and IST. However, these servo track groups OST, MST and IST may be changed appropriately in accordance with the diameter and the track density of the magnetic disk 1. Additionally, there are many servo algorithms which may be selected according to an employed design, and the described embodiment uses one form of them.

In placement of the servo tracks, it is preferable to locate the outer servo track group OST at the outermost circumference and coincide the servo track OST1 with the zero track for the purpose of determining the positions of the servo tracks.

The described embodiment uses the stepping motor 11. However, it may be replaced by a voice coil motor or DC torquer combined with a suitable displacement control.

Summarizing the second embodiment, the information recording medium is provided with servo tracks having servo information written thereon in a relation with the interior index signal. The head assembly is brought to the servo tracks at any desired time and placed at the fine track position of the servo track under a servo control based on the servo information, and the positioning information obtained here is used to return the head assembly to its preceding recording position and place it at the fine track position of the recording track. Therefore, the head assembly can be placed at a precise track position by detection of the servo information at any desired time. This reduces useless time during positioning operation and establishes an effective property of the disk driving device. Further, since servo information is written on limited specific tracks serving as the servo tracks, the remainder of the tracks can be used for recording or reproduction throughout the entire circumferential length, and a reliable recording or reproduction is performed without slowing down the revolution velocity of the magnetic disk.

[THIRD EMBODIMENT]

A third embodiment of the invention is described below.

Figure 7:
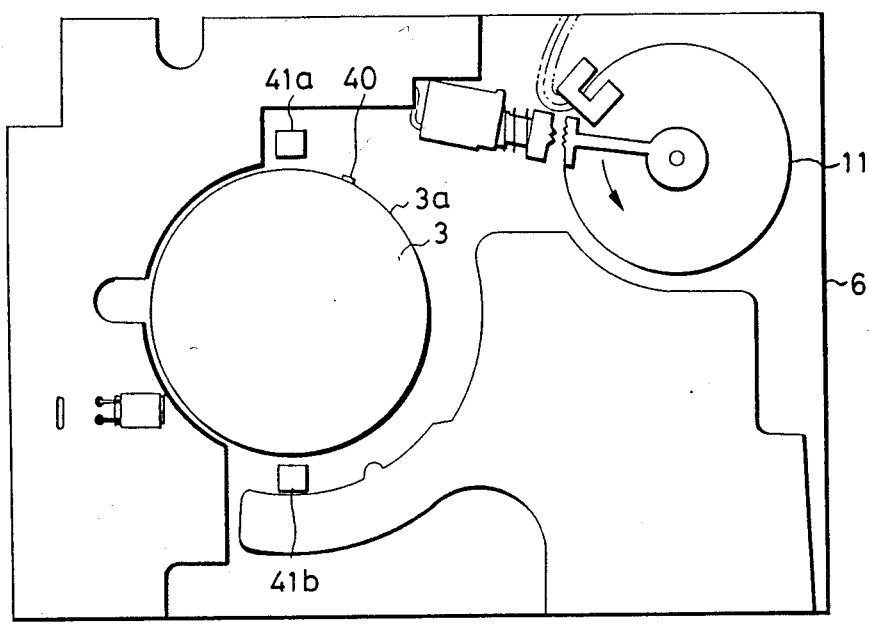

The aforegoing second embodiment, for the purpose of forming servo information in a relationship with the interior index, has the arrangement shown in FIG. 7 in which the magnet 40 as a signal generating means to obtain the index signal is provided at a position radially outward of the rotor 3a of the DD motor 3 so as to be opposed to magnetic sensors 41a and 41b such as Hall elements provided near the outer circumferential margin, so that a magnetic change occurring when the magnet passes along the magnetic sensor 41a and 41b during rotation of the rotor 3a is changed to a pulsive signal and used as the index signal.

As shown in FIG. 5, the index signal normally includes the interior index signal IN for defining the position on the magnetic disk at the side of the disk driving device, and the exterior index signal EIN indicating the writing start position for the host computer. The exterior index signal EIN is supplied a predetermined time later than detection of the interior index signal IN. Therefore, detection of the interior index signal IN is an important factor.

The interior index signal is related to the exterior index signal in this fashion, and detection of a sector position, for example, sometimes requires a plurality of interior index signals IN. In this case, however, since the exterior index signal EIN may be one per one cycle, it is not possible to correlate individual interior index signals IN with the single exterior index signal, and this makes it necessary to limit the number of the interior index signal IN to one piece per cycle, in compliance with the exterior index signal.

The third embodiment is proposed in the above-described technical background, and aims to relate the exterior index signal with a specific one of interior index signals.

For this purpose, in a disk driving device using magnets mounted to a rotor of a disk-shaped recording medium driving motor, and a magnetic sensor opposed to the outer circumferential margin of the rotor to detect a magnetic field from the magnets, so that a magnetic change detected by the sensor when the magnets pass by the magnetic sensor is used as an interior index signal, the embodiment has a specific arrangement in which first and second magnets are mounted to the rotor, so that the first magnet generates an interior index signal related to the exterior index signal, and the second magnet generates an interior index signal not related to the exterior index signal, respectively, and the polarities of the surfaces of the first and second magnets opposed to a detecting portion of the magnetic sensor are different from each other.

With this arrangement, a signal from the first magnet can be discriminated from a signal from the second magnet, and the exterior index signal can be always obtained only from the first magnet member also when the number of second magnets is increased.

The embodiment is hereinbelow explained in detail, referring to the drawings.

Figure 8:
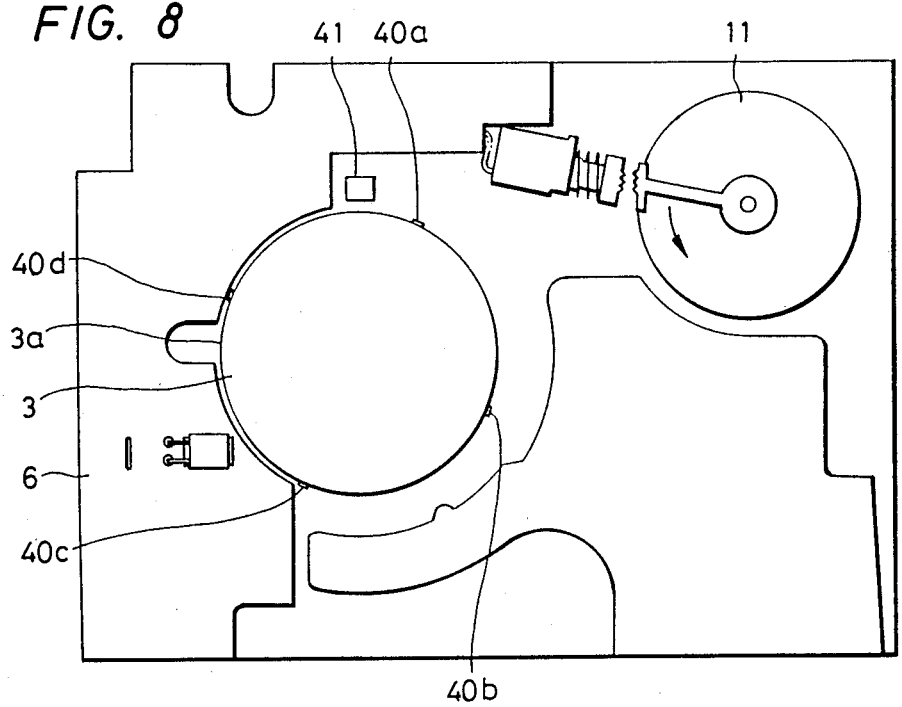
Figure 9:
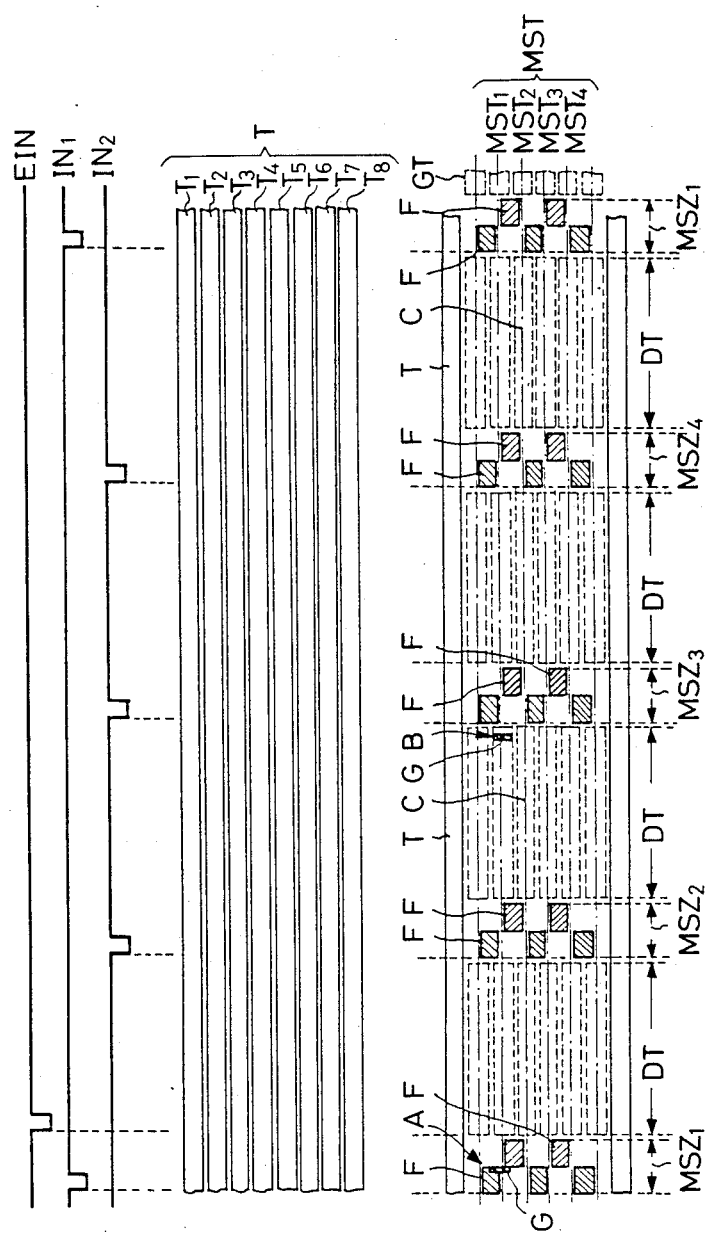
Figure 10:
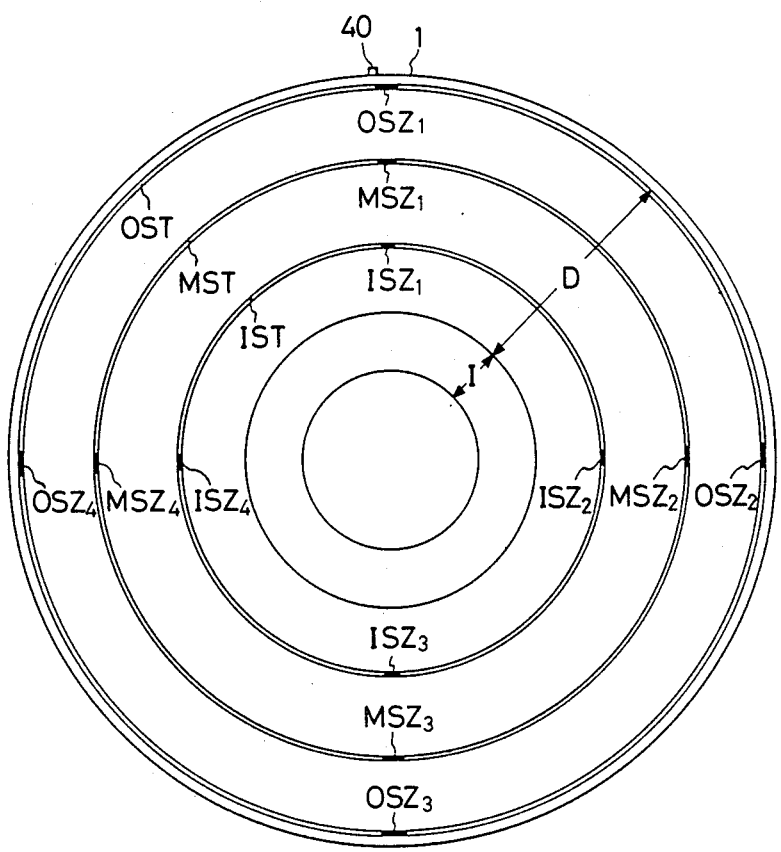

FIGS. 8 through 10 are different views to explain a disk driving device according to the third embodiment, in which FIG. 8 is a bottom view of the disk driving device for explanation of its index detection, FIG. 9 shows recording tracks of a magnetic disk and a configuration of servo signals written thereon, and FIG. 10 shows various regions on the magnetic disk. The third embodiment includes the same control system and servo circuit as those of the first and second embodiments, and a redundant explanation is omitted here. Further, the disk driving device itself is the same as the prior art device of FIG. 27. Members or parts which are or may be regarded to be equal to those of the prior art device and preceding embodiments are denoted by the same reference numerals, and a redundant explanation is omitted adequately.

FIG. 10 shows servo tracks provided on the magnetic disk 1 and a configuration of recording tracks on which servo information is not applied. The magnetic disk 1 may be made of an aluminum plate having magnetic coating, and includes an inhibit zone I and a data zone D. The inhibit zone I is located at the radially innermost position, and no data is written thereon. The data zone D is located radially outwardly of the inhibit zone I and has about six hundred recording tracks T aligned concentrically. The data zone D is divided into three segments each having a group of servo tracks in which four tracks as shown in FIG. 9 form one group. The servo track groups are a servo track group OST at an outer circumferential portion, a servo track group MST at an intermediate portion and a servo track group IST at an inner circumferential portion. In individual servo track groups OST, MST and IST, servo zones OSZ1, OSZ2, OSZ3, OSZ4, MSZ1, MSZ2, MSZ3, MSZ4, ISZ1, ISZ2, ISZ3 and ISZ4 are written servo signals F, i.e. servo information, at 90 degrees interval.

FIG. 9 shows a servo track group MST provided at an intermediate portion, among others. The servo track group MST includes four servo tracks MST1, MST2, MST3 and MST4 on each of which servo signals F are written alternatingly at a uniform frequency and in a zigzag configuration at positions uniform distant from a center line C in the length (circumferential) direction, in a relationship with first and second interior index signals IN1 and IN2. They correspond to the aforegoing servo zones MSZ1, MSZ2, MSZ3 and MSZ4. In this case, since the servo signals F are written by a single magnetic head 2, the widths of the servo signals F, recording tracks T and servo tracks MST1 through MST4 coincide with the length of a gap G of the magnetic head 2. An off-track phenomenum occurs when the position of the gap G of the magnetic head 2 deviates from a desired recording track T.

In this embodiment, a phase difference of 90 degrees is provided among servo zones OSZ1, OSZ2, OSZ3 and OSZ4, among MSZ1, MSZ2, MSZ3 and MSZ4 and among ISZ1, ISZ2, ISZ3 and ISZ4, considering the time required for positional correction of the magnetic head 2 and the time required for one revolution of the magnetic disk 1. More specifically, the time required for one revolution of the magnetic disk 1 is about 16.67 msec at 3600 rpm, the time from energization to deenergization of the stepping motor 11 is about 8 msec. Therefore, with the 90-degree phase difference in the servo zones, it is possible to correct the position of the magnetic head 1 by detecting servo signals F in the servo zones OSZ1, MSZ1 and ISZ1 associated with the first interior index signal IN1, for example, and immediately after termination of the correcting operation, it is possible to confirm whether the correcting operation is adequate or not, by detecting servo signals F in the servo zones OSZ3, MSZ3 and ISZ3 in advance or retard by 180 degrees and associated with the second interior index signal IN1. In this case, since the time for one revolution of the magnetic disk 1 has the aforegoing relationship with the energized duration of the stepping motor 11, four servo zones are provided in one cycle at 90 degrees interval to reduce the time for the head to go to read the servo signal. However, the servo zones may be only two at 180 degrees interval.

The number of servo zones per cycle may be changed adequately according to the time of the positioning motion by an employed stepping motor 11 or other driving motor and the revolution of an employed recording medium. For example, if the time for the positioning motion is 4 msec approximately, it is possible to correct the position by detecting servo signals F of the servo zones OSZ1, MSZ1 and ISZ1 corresponding to the first interior index signal, and immediately after termination of the correcting motion, detect adequacy or inadequacy of the correcting motion by detecting servo signals of the servo zones OSZ2, MSZ2 and ISZ2 different in phase by 90 degrees and associated with the second interior index signal IN2.

Further, in the disk driving device, since the servo zones OSZ1, OSZ2, OSZ3, OSZ4, MSZ1, MSZ2, MSZ3, MSZ4, ISZ1, ISZ2, ISZ3 and ISZ4 are provided 90 degrees interval, the same phase difference is also required in the first and second interior index signals IN1 and IN2. In this connection, as shown in FIG. 8, for example, four magnets 40a, 40b, 40c and 40d (hereinafter called "PG magnets") serving as a pulse generating means are provided at outer circumferential portions of a rotor 3a of the DD motor 3, so that a magnetic change from the PG magnets 40a through 40d is detected by a magnetic sensor (hereinafter called "PG sensor") 41 consisting of Hall elements or coils, for example, and provided near the outer circumferential portion of the rotor 3a of the DD motor 3.

In the aforegoing magnets, a phase difference of 90 degrees is provided among a first magnet 40a for generating a first interior index signal corresponding to an exterior index signal EIN and second magnets 40b, 40c and 40d for generating a second interior index signal not corresponding to the exterior index signal EIN, and the first magnet 40a has a surface opposed to the PG sensor 41 which has a polarity opposite to the polarity of similar surfaces of the second magnets 40b, 40c and 40d. With this arrangement, the first interior index signal can be reliably discriminated from the second interior index signal.

FIG. 9 also shows guard tracks GT provided radially inward and outward of the group of servo tracks MST. Individual guard tracks GT and servo tracks MST1 through MST4 include dummy tracks DT having no servo signal F recorded thereon and never used as data regions. When the first index signal IN1 is detected, counting is commenced, and when a predetermined number is counted, the exterior index signal EIN is transmitted to the host computer 26. The exterior index signal EIN is used as an index of writing or reading of the recording tracks T in the data zone D.

With this arrangement, the disk driving device operates as follows.

Immediately after a power is entered in the disk driving device, the magnetic head 2 first scans the surface of the magnetic disk 1 to memorize in the RAM of the driving circuit 22 the electrical amount concerning the exciting phases of the stepping motor 11 corresponding to respective recording tracks T, and thereby makes the RAM table. Additionally, a positioning correction system considering an increase in the temperature is originally stored in a microcomputer so that signal recording or reproduction is normally performed in accordance with the servo algorithm stored in the microcomputer. More specifically, if the microcomputer gives the driving circuit 2 a servo instruction based on the aforegoing servo algorithm while recording or reproduction of a desired recording track is performed by energization of a predetermined exciting phase member in accordance with the RAM table, the magnetic head 2 is moved from a recording track T1 (or T5), for example, to a servo track MST1, for example, in the same exciting phase as the recording track T1 in a servo zone MST nearest to the recording track T1 (T5). If the magnetic head 2 is heretofore located at the recording track T2 (or T6), it is moved to the servo track MST2. Similarly, if the recording track is T3 (T7) or T4 (T8), the servo track will be MST3 or MST4, respectively. In this embodiment, one cycle of the stepping motor 11 consists of eight steps. Therefore, one servo zone has four tracks corresponding to the number of steps per half cycle of the stepping motor 11. When other form of the stepping motor 11 or other control system is employed, the number of servo tracks will be changed accordingly.

Assuming that the same exciting phase member is energized by the same voltage value, and the gap G of the magnetic head 2 located in position A in FIG. 9 detects a servo signal F, a difference arises between the level of a precedingly detected servo signal and the level of a subsequently detected servo signal. In this connection, sample holding circuits 28 and 29 (FIG. 4) of the servo circuit 23 discriminate the signals, and a comparator 30 compares their signal levels. A servo amplifier 31 determines a voltage value for application to the exciting phase member of the stepping motor 11 in accordance with the comparison result to control the stepping motor 11 via the driving circuit 22. In this fashion, the gap G of the magnetic head 2 is moved to and fixed at position B (FIG. 9) different in phase by 180 degrees, and the fine track position is established in the servo track MST1.

Immediately after the movement of the magnetic head 2 is terminated, a servo signal F in the third servo zone MSZ3 is detected for the aforegoing reason to judge whether the movement is adequate or not. More specifically, if an output from the comparator circuit 30 in the third servo zone MSZ3 is lower than a predetermined level, the present movement condition is maintained. However, if the output is higher than the predetermined level, the stepping motor 11 is driven again to effect the same positional control to bring the magnetic head 2 to a precise track position, i.e. the fine track position.

A voltage value applied to an exciting phase of the stepping motor 11 on arrival to the fine track position is stored in the RAM of the driving circuit 22, and the magnetic head 2 returns to its original track T1, referring to the aforegoing RAM table, so that the position of the gap G with respect to the recording track T1 is fixed by the voltage value stored in the RAM. In this fashion, the fine track is established also in the recording track T1.

The other members or components not specifically explained here have the same arrangements and functions as those of the first and second embodiments.

As described, according to the third embodiment, since the surface of the first magnet 40a opposed to the PG sensor 41 to generate the first interior index signal has a polarity opposite to that of the surfaces of the second magnets 40b, 40c and 40d opposed to the PG sensor 41 to generate the second interior index signal, the first interior index signal corresponding to the exterior index signal is reliably discriminated. Additionally, since the servo zones have a phase difference of 90 degrees, the waiting time to read a servo signal after movement of the magnetic head 2 to the servo track is significantly decreased. This contributes to an efficient servo control. In other words, this arrangement enables a reliable discrimination of the first interior index signal corresponding to the exterior index signal from the second interior index signal not corresponding to the exterior index signal.

[FOURTH EMBODIMENT]

A fourth embodiment of the invention is hereinbelow described.

Generally summarizing the aforegoing first to third embodiments, servo tracks on which predetermined pieces of servo information are written in a relationship with an interior index are provided only at limited track positions on an information recording medium, so that the head assembly moved at any desired time from a recording track for a subsequent writing or reading to associated one of the servo tracks to read servo information, and the servo information detected thereby controls a driving voltage to be applied to a head assembly transport motor to precisely place the head at the fine track position in the servo track. After this, the head assembly is returned to its original recording track and placed at the fine track position therein according to the positioning information regarding the fine track position in the servo track. Subsequently, if desired, the servo information is detected to place the head assembly at a precise track position. This decreases useless time during the positioning operation and improves the efficiency of the disk driving device. Also, only specific tracks are used as servo tracks provided with servo information, so that the other tracks can be fully used for recording or reproduction throughout the entire circumferential lengths thereof. Therefore, a reliable recording or reproduction is possible, without any slow-down of the rotating velocity of the magnetic disk.

However, if the magnetic head deviates from a desired track to any other track due to an external impact or other causes during formatting of the magnetic disk at a user's end, i.e. when a mis-step phenomenum occurs during formatting, there is a possibility that the formatting is performed against a servo track, erroneously recognizing the servo track as a recording track. If so, the servo information originally written on the servo track will be erased, and the head will not be able to obtain the servo information from the track thereafter.

The fourth embodiment is proposed in view of the aforegoing technical background, and aims to eliminate an erroneous erasure of the servo information regardless of a mis-track during formatting.

To attain the object, in a magnetic disk driving device including tracks concentrically aligned on a disk-shaped magnetic recording medium and traced by a magnetic head for signal writing or reading, the embodiment features the use of a specific arrangement of the magnetic recording medium and the use of a detecting means. More specifically, the magnetic recording medium is provided with a plurality of servo tracks and recording tracks. The servo tracks form some groups of tracks on which positioning information of the magnetic against respective tracks is written, and the recording tracks are provided with track discriminating signals originally written thereon and also used to write data thereon. The detecting means detects the track discriminating signals written on the recording tracks.

With this arrangement, the recording tracks are discriminated from the servo tracks during formatting operation by the track discriminating signals on the recording tracks to protect the servo tracks against erroneous formatting and erroneous erasure of the servo information from the servo tracks.

The fourth embodiment is hereinbelow described in detail, referring to the drawings.

Figure 11:
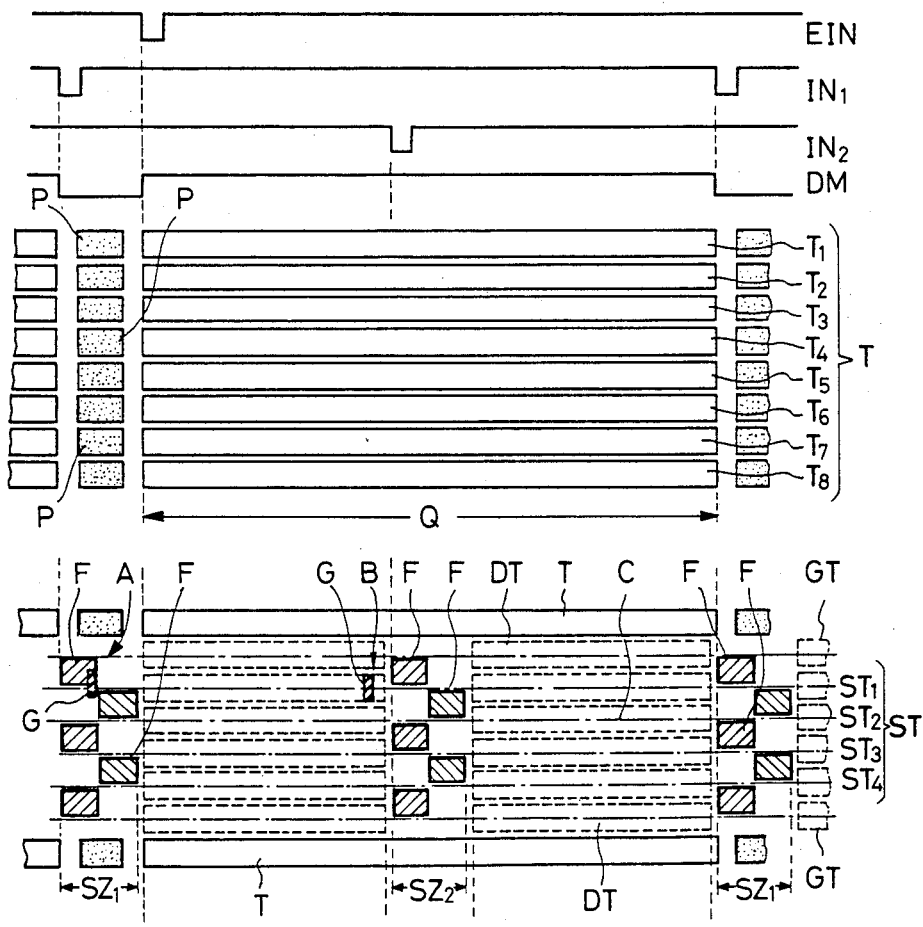
Figure 12:
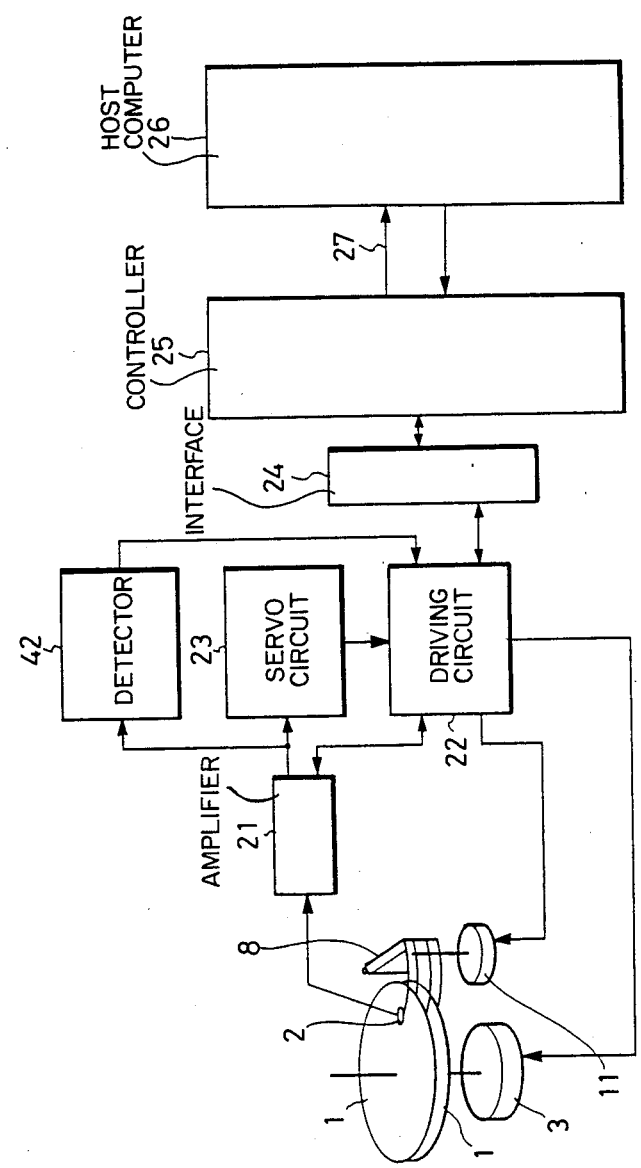
Figure 13:
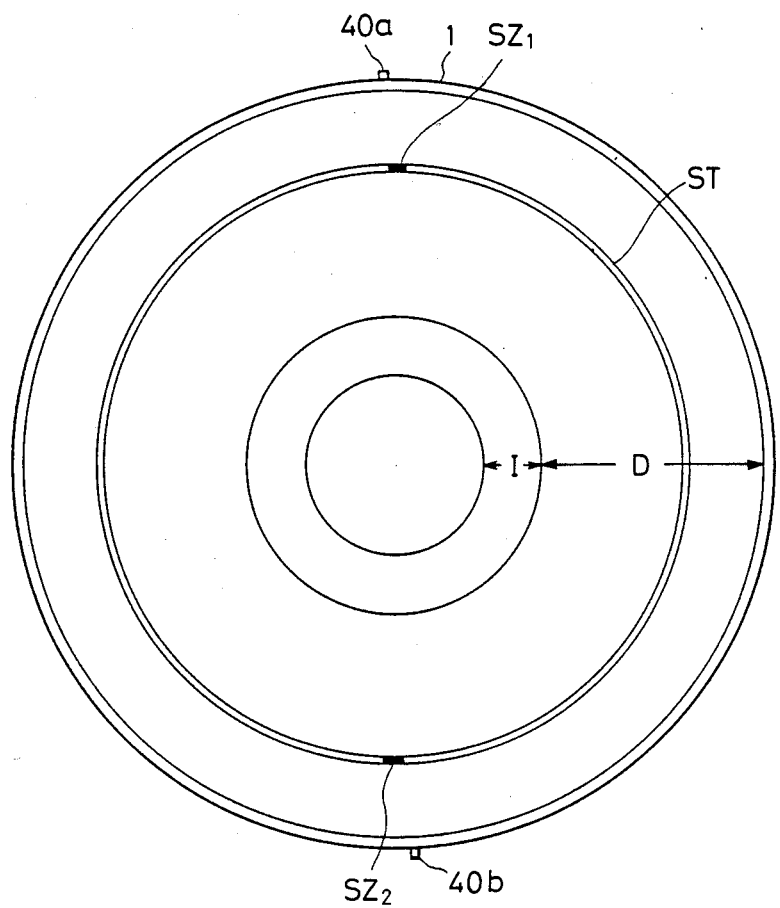
Figure 14:
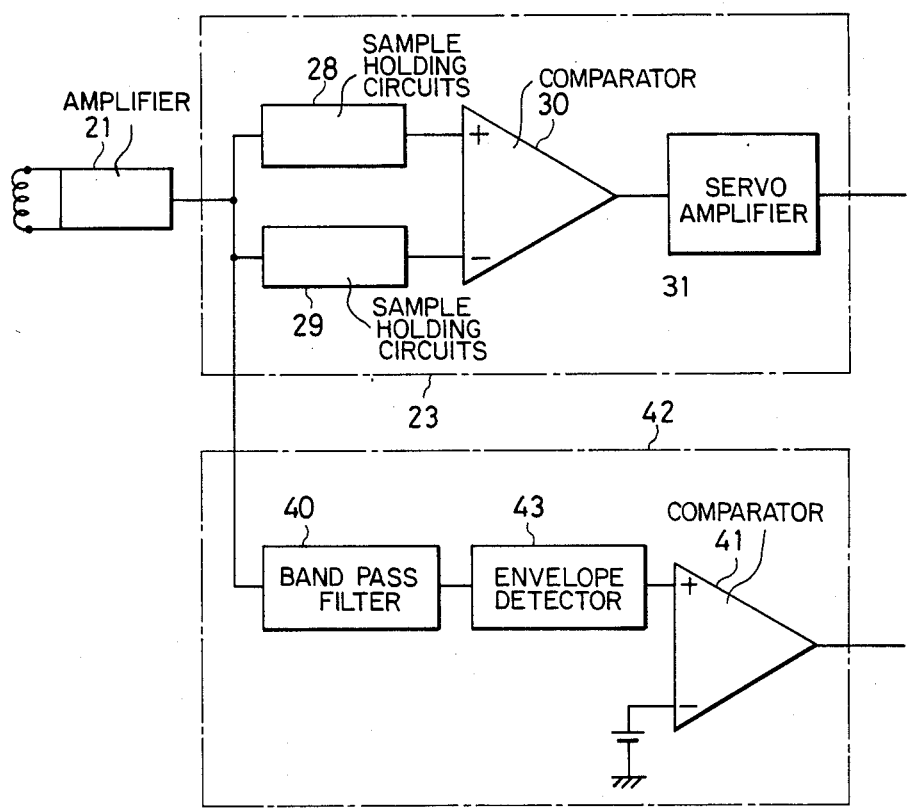
Figure 15:
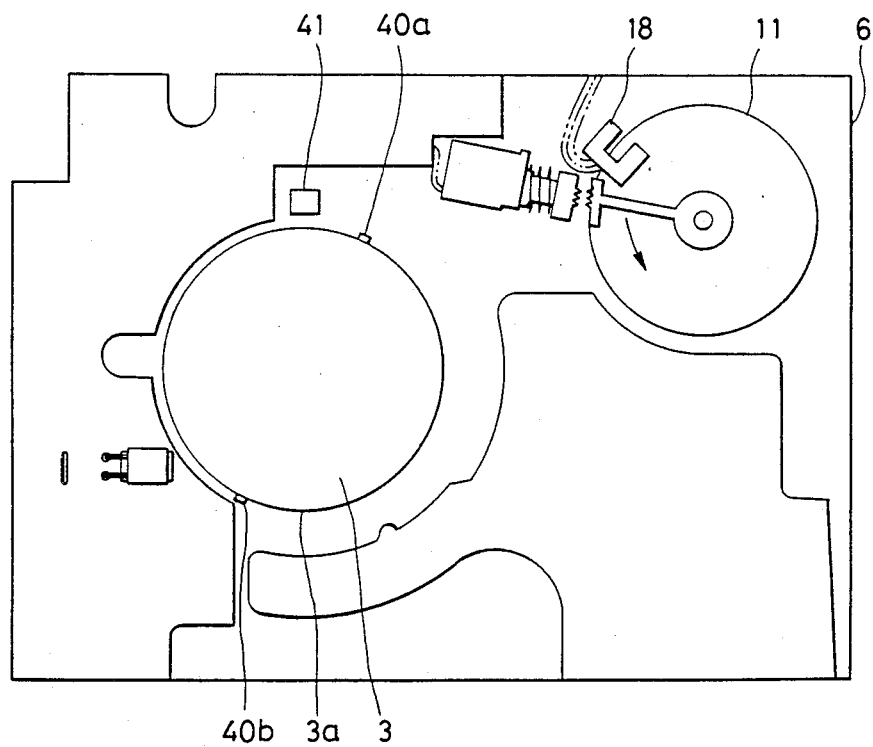

FIGS. 11 through 15 are various views for explanation of a disk driving device according to the fourth embodiment, in which FIG. 11 shows recording tracks on a magnetic disk and a configuration of written servo signals, FIG. 12 is a block diagram of a control system of the disk driving device, FIG. 13 shows various regions on the magnetic disk, FIG. 14 is a block diagram of a servo circuit and a detecting circuit, and FIG. 15 is a bottom view of the disk driving device for explanation of its index detection. The disk driving device itself is the same as the prior art device of FIG. 27. Members or parts which are or may be regarded to be equal to those of the prior art device are denoted by the same reference numerals.

In FIG. 12, the control system of the disk driving device controls a DD motor 3 for rotating a magnetic disk 1 and a stepping motor 11 for swinging a swing arm 8. The control system comprises a driving circuit 22 for signal transmission and reception with respect to a head amplifier 21, a servo circuit 23 which processes servo information picked up by the magnetic head and amplified by the head amplifier 21 to supply the driving circuit 22 with an electric signal concerning a servo control, and a controller 25 for controlling the driving circuit 22 via an interface 24. The controller 25 is connected to a host computer 26 by a bus 27 to enable signal processing of a signal detected by the magnetic head 2 or a signal to be transmitted to the magnetic head 2.

FIG. 13 shows different regions on the magnetic disk 1, namely, servo tracks and recording tracks having track discriminating signals recorded thereon. The magnetic disk 1 may be made from an aluminum plate having magnetic coating. The magnetic disk 1 has an inhibit zone I and a data zone D. The inhibit zone I is located at a radially inner position thereof, and no data is written thereon. The data zone D is located at a radially outer position thereof and has about six hundred recording tracks T aligned concentrically. The data zone D is provided at a central portion thereof with a servo track group ST of four tracks ST1 through ST4 as shown in FIG. 11. Each track has servo zones SZ1 and SZ2 on which servo signals F, i.e. servo information, are written at 180 degree phase difference.

FIG. 11 shows a servo track group ST provided at an intermediate portion, among others, and track discriminating signals P. The servo track group MST includes four servo tracks ST1, ST2, ST3 and ST4 on each of which servo signals F are written alternatingly at a uniform frequency and in a zigzag configuration at positions equally distant from a center line C in the length (circumferential) direction, in a relationship with first and second interior index signals IN1 and IN2. On recording tracks T other than the servo tracks ST1 through ST4 are written track discriminating signals P related to the first index signal 1, so that when a predetermined number is counted from issue of the first interior index signal IN1, the exterior index signal EIN is applied to the host computer. The exterior index signal EIN is used as an index of signal writing or reading of the recording tracks T in the data zone D. A region Q from detection of the exterior index signal IN1 is used for recording, whereas the region from detection of the first interior index signal IN1 to supply of the exterior index signal EIN is never used for recording nor reproduction because a data mask signal DM exists.

Also in the fourth embodiment, since the servo signals F are written by a single magnetic head 2, the widths of the servo signals F, track discriminating signals P, recording tracks T and servo tracks ST1 through ST4 coincide with the length of the gap G of the magnetic head 2. An off-track phenomenum occurs when the position of the gap G of the magnetic head 2 deviates from a desired recording track T.

In this embodiment, a phase difference of 180 degrees is provided among the servo signals F in the servo zones SZ1 and SZ2 in one servo track for the same reason as that of the second embodiment.

In this embodiment, since the 180 degrees phase difference is provided between the servo zones SZ1 and SZ2, the same phase difference is also required in the first and second interior index signals IN1 and IN2. In this connection, as shown in FIGS. 13 and 15, two magnets 40a and 40b (hereinafter called "PG magnets") having different polarities serving as a pulse generating means are provided along the outer circumferential margin of a rotor 3a of the DD motor 3, so that a magnetic change from the PG magnets 40a and 40b is detected by coils, Hall elements or other detecting means (hereinafter called "PG sensors") 41 opposed to the circumferential margin of the rotor 3a and located at symmetrical positions with respect to the rotation axis of the DD motor 3, and the detected pulses are used as the first and second interior index signals IN1 and IN2.

With this arrangement, the disk driving device operates as follows.

Immediately after a power is entered in the disk driving device, the magnetic head 2 first scans the surface of the magnetic disk 1 as described before to memorize in the RAM of the driving circuit 22 the electrical amount concerning the exciting phases of the stepping motor 11 corresponding to respective recording tracks T, and thereby makes the RAM table. When the driving circuit 22 receives a servo instruction from a microcomputer while signal recording or reproduction is effected in a desired recording track T by energization of a predetermined exciting phase according to the RAM table, the magnetic head 2 is moved from a recording track T1 (or T5), for example, to a servo track ST1, for example, in the same exciting phase as the recording track T1. If the magnetic head 2 is heretofore located at the recording track T2 (or T6), it is moved to the servo track ST2. Similarly, if the recording track is T3 (T7) or T4 (T8), the servo track will be ST3 or ST4, respectively. Naturally, the RAM table is renewed in the same manner as in the aforegoing embodiments.

Assuming that the same exciting phase is energized with the same voltage value, and the gap G of the magnetic head 2 located in position A in FIG. 11 detects a servo signal F, a difference arises between the level of a precedingly detected servo signal and the level of a subsequently detected servo signal. In this connection, sample holding circuits 28 and 29 (FIG. 14) of the servo circuit 23 discriminate the signals, and a comparator 30 compares their signal levels. A servo amplifier 31 determines a voltage value for application to the exciting phase of the stepping motor 11 in accordance with the comparison result to control the stepping motor 11 via the driving circuit 22. In this fashion, the gap G of the magnetic head 2 is moved to and fixed at position B (FIG. 11) symmetrical to the position A with respect to the center line C, and the fine track position is established in the servo track ST1.

Immediately after the movement of the magnetic head 2 is terminated, a servo signal F in the second servo zone SZ2 is detected for the same reason as in the aforegoing embodiments, to judge whether the movement is adequate or not. More specifically, if an output from the comparator 30 in the second servo zone SZ2 is lower than a predetermined level, the present movement condition is maintained. However, if the output is higher than the predetermined level, the stepping motor 11 is driven again to effect the same positional control to bring the magnetic head 2 to a precise track position, i.e. the fine track position.

A voltage value applied to an exciting phase of the stepping motor 11 at arrival to the fine track position is stored in the RAM of the driving circuit 22, and the magnetic head 2 returns to its original track T1, referring to the aforegoing RAM table, so that the position of the gap G with respect to the recording track T1 is fixed by the voltage value stored in the RAH. In this fashion, the fine track position is established also in the recording track T1.

Next, formatting is explained below.

Formatting is to divide the recording track T to some units called sectors. Before shipment from a factory, servo signals F are written in servo tracks ST1 through ST4 in a relationship with the first and second interior index signals IN1 and IN2, and track discriminating signals P are written in respective tracks T in a relationship with the first interior index signal IN1. After shipment, formatting is effected by a user, i.e. each recording track T is divided according to a desired format. In this case, presence or absence of the track discriminating signal P is detected to judge whether formatting may by effected in the track or not, so that only when the track discriminating signal P is detected, formatting is performed. More specifically, as shown in FIG. 14, a signal detected by the magnetic head 2 is amplified by the head amplifier 21, and the track discriminating signal P is searched by a band pass filter 40, envelope detector 43 and comparator 41. When the track discriminating signal P is recognized, a detector 42 supplies a format permitting signal to the driving circuit 22, and the formatting is performed. In this fashion, regardless of a possible mis-step of the magnetic head 2, formatting is never effected to the servo tracks ST1 through ST4, and their servo signals F are never erased.

Among the track discriminating signals P, the signal P on the outermost circumferential track T may be written at a frequency different from those of the other track discriminating tracks so that it can be used to detect the zero track. In this case, a photo interrupter 18 shown in FIGS. 15 and 27 may be omitted.

As described, since track discriminating signals originally recorded on the recording tracks to permit a user to make a format only on the recording tracks and not on the servo tracks upon recognition of the track discriminating signal, servo information on the servo tracks are never erased by erroneous formatting to the servo tracks.

[FIFTH EMBODIMENT]

A fifth embodiment of the invention is hereinbelow described.

Figure 6:
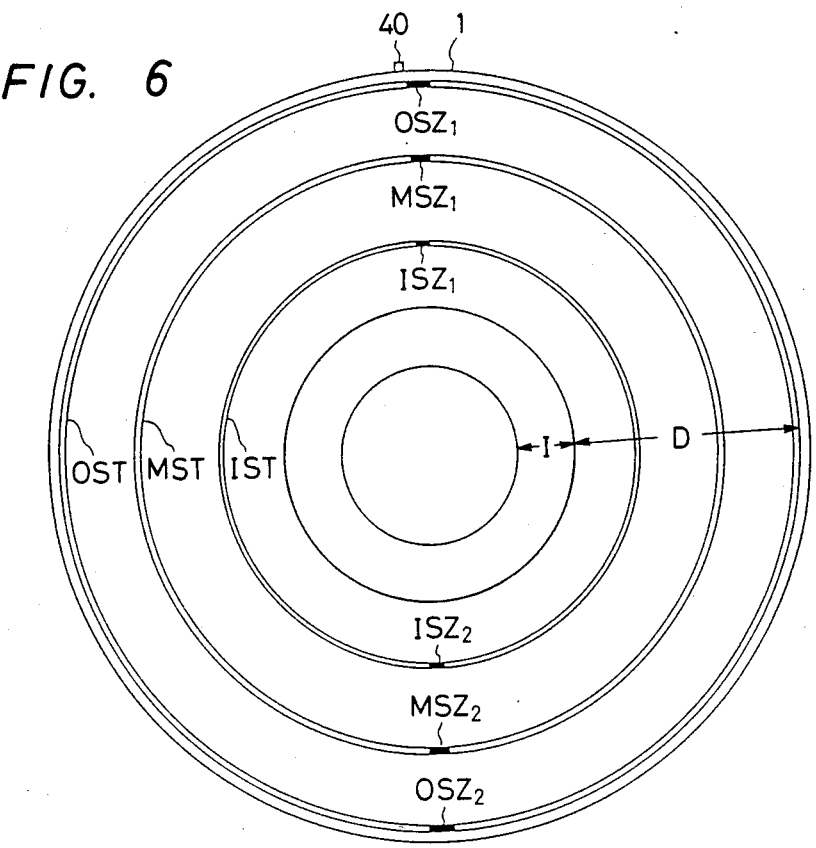

In the first to fourth embodiments, there is a problem about the track position on which servo information is written in a relationship with the interior index signal. More specifically, in case that groups of servo tracks related to exciting phases of the head transport motor are formed only at a central portion of the data region, significant time is required for the head assembly to return to its original recording track after reading the servo information on the servo tracks if the data region is wide (the time is hereinafter called "servo seeking time"). FIG. 6 shows one form to avoid this, in which the data region D is divided into three, and a group of four servo tracks MST1 through MST4 is formed in each division. This certainly decreases the servo seeking time. However, increased servo tracks reduce the recording track.

The fifth embodiment is proposed in the aforegoing technical background, and aims to minimize the servo seeking time and the decrease of the recording tracks. For this purpose, in a magnetic disk driving device including tracks concentrically aligned on a disk-shaped magnetic recording medium and traced by a magnetic head for signal writing or reading, the fifth embodiment features the use of a magnetic recording medium including first and second servo tracks. The first servo track is provided with servo information written thereon for use of defining center positions of the tracks, and the second servo tracks are used to correct thermal expansion or contraction of the medium. The device further comprises a servo circuit which reads the servo information and responsively produces fine track position information regarding the corresponding track, a memory means which stores the fine track position information, a correcting means which reads the servo information from the second servo tracks to correct the fine track position information stored in the memory means, and a control means which selectively picks up an output from the memory means or an output from the servo circuit to control the magnetic head transport motor.

With this arrangement, the fine track position on each recording track is originally related to the exciting phase and exciting voltage of the transport motor in the first servo track, and the head assembly moves to a second servo track nearest to a desired recording track upon signal recording or reproduction to read the servo information therefrom. The system detects a deviation in the center position, and stores a correcting value concerning the deviation. Based on the deviation information concerning the center position in the servo track, the system corrects individual recording tracks according to the servo information from the first servo track and the exciting voltage to the exciting phase of the transport motor so that the deviation information from the second servo track represents center position defining information of the first servo track.

In this fashion, when the magnetic head is located from the first servo track, nearer one of the second servo tracks is used to bring the magnetic head at the center in the recording track in a short time.

The fifth embodiment is hereinbelow described in detail, referring to the drawings.

Figure 16:
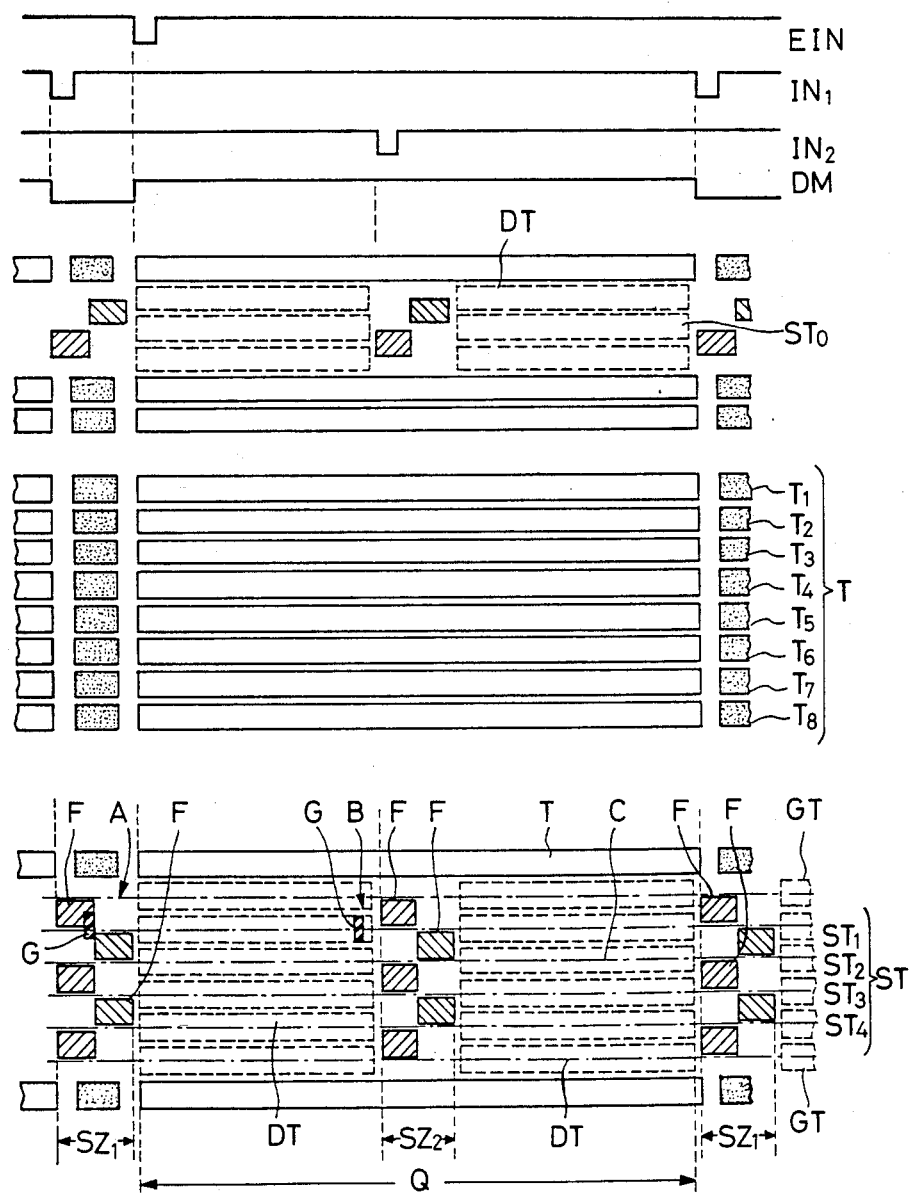
Figure 17:
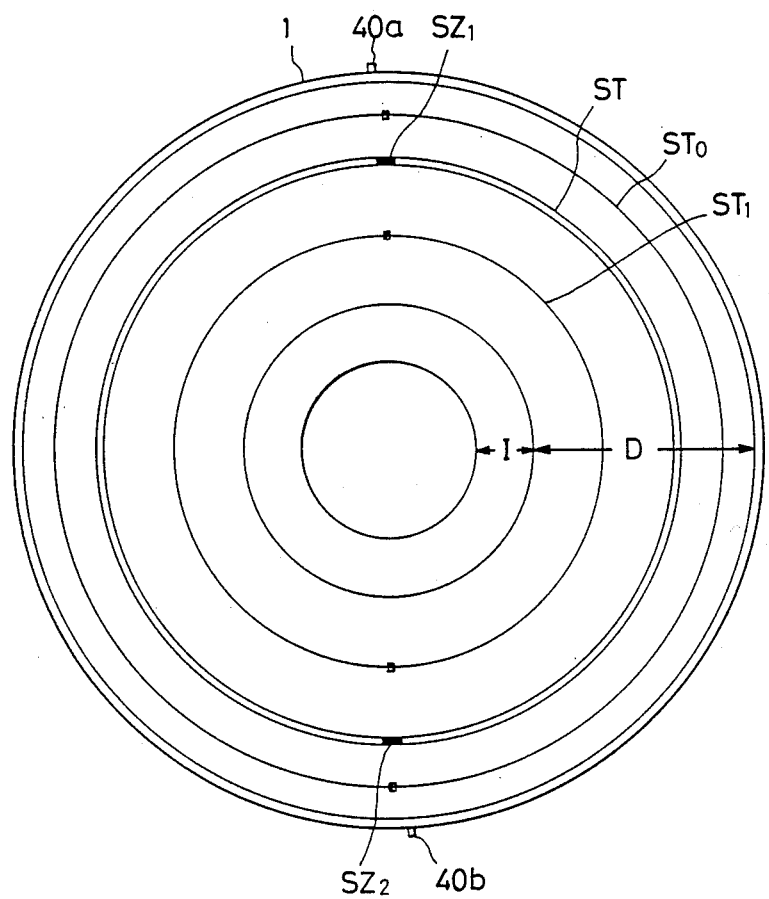

FIGS. 16 and 17 are different views for explanation of a disk driving device according to the embodiment, in which FIG. 16 shows recording tracks on a magnetic disk and a configuration of written servo signals, and FIG. 17 shows various regions on the magnetic disk. The control system of the disk driving device is equal to the control system shown in FIG. 12, and the servo circuit and detecting circuit are equal to those shown in FIG. 14, respectively. The disk driving system itself is uniform to the prior art device of FIG. 27. However, the index detecting means has the same arrangement as that of the fourth embodiment shown in FIG. 15. Members or parts which are or may be regarded to be the same as those of the prior art device or the aforegoing embodiments are designated by the same reference numerals, and a redundant explanation is omitted adequately.

FIG. 16 is a view for explanation of a first servo track group ST provided in an intermediate portion of the disk 1, second servo tracks ST0 and ST1 provided at the outermost and innermost circumferential portions, and track discriminating signals P. The first servo track group ST consists of four first servo tracks ST1, ST2, ST3 and ST4. On each of the servo tracks ST1, ST2, ST3, ST4, ST0 and ST1 are written servo signals F related to first and second interior index signal IN1 and IN2 at a uniform frequency and in a zigzag configuration at positions equally distant from a center line C in the length (circumferential) direction of the disk. On recording tracks T other than the servo tracks ST1 through ST4, ST0 and ST1 are written track discriminating a signals P corresponding to the first index signal IN1, so that when a predetermined number is counted from the first interior index signal IN1, the exterior index signal EIN is applied to the host computer. The exterior index signal EIN is used as an index of signal writing or reading of the recording tracks T in the data zone D. A region Q from detection of the exterior index signal EIN to subsequent detection of the first interior index signal IN1 is used for recording, whereas the region from detection of the first interior index signal IN1 to supply of the exterior index signal EIN is never used for recording nor reproduction because a data mask signal DM exists.

Also in the fourth embodiment, since the servo signals F are written by a single magnetic head 2, the widths of the servo signals F, track discriminating signals P, recording tracks T and servo tracks ST1 through ST4, ST0 and ST1 coincide with the length of the gap G of the magnetic head 2. An off-track phenomenum occurs when the position of the gap G of the magnetic head 2 deviates from a desired recording track T.

In this embodiment, a phase difference of 180 degrees is provided among servo signals F on each servo track, considering the time required for positional correction of the magnetic head 2 and the time required for one revolution of the magnetic disk 1, as in the fourth embodiment.

In this embodiment, since the 180 degrees phase difference is provided between the servo zones SZ1 and SZ2, the same phase difference is also required in the first and second interior index signals IN1 and IN2. In this connection, an index detecting means is arranged as FIGS. 4 and 5 which were referred to in the explanation of the fourth embodiment.

With this arrangement, the disk driving device operates in the same fashion as the fourth embodiment, except renewal of the RAM table. Therefore, a redundant explanation of the same operation is omitted here, and the renewal of the RAM table is explained below.

The RAM table is renewed upon an increase of the temperature or with time so that the magnetic head 2 is always controlled based on the latest positional data. Upon recording or reproduction, positional correction of the head is effected according to the aforegoing servo algorithm. At this time, the RAM table is renewed, using the second servo tracks ST0 and ST1. More specifically, it is recognized that positional errors in the four first servo tracks ST1, ST2, ST3 and ST4 represent a substantially uniform pattern in four steps. Therefore, the error in one step may be deemed to be approximately equal to the error in each of the other three steps. Accordingly, the error in one step is used as a correcting amount to correct the other steps, and the RAM table is renewed according to the correcting amount on every instance.

Also in this case, servo control instructions are supplied not only from the driving circuit 22 but also from the controller 25 and the host computer 26, so as to precisely locate the head in the same manner as described to always establish the best recording or reproducing condition.

The track discriminating signals P written on the recording tracks T are equal to those of the fourth embodiment, and are significantly effective in an arrangement in which servo tracks ST0, ST1, etc. each consisting of a single track are provided in each of divided regions, in the sense of prevention of erroneous erasure on the servo tracks ST0 and ST1.

Next, a modified arrangement is explained below.

Figure 18:
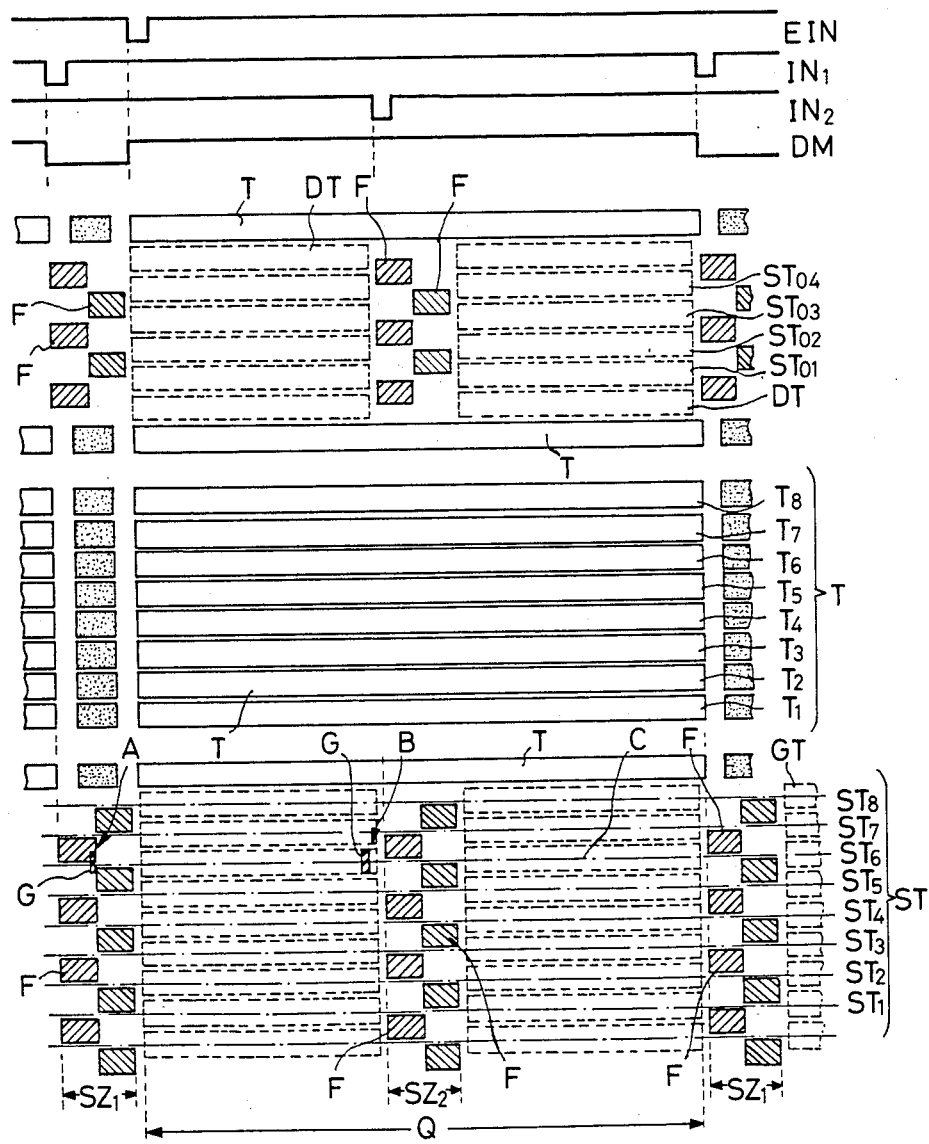
Figure 19:
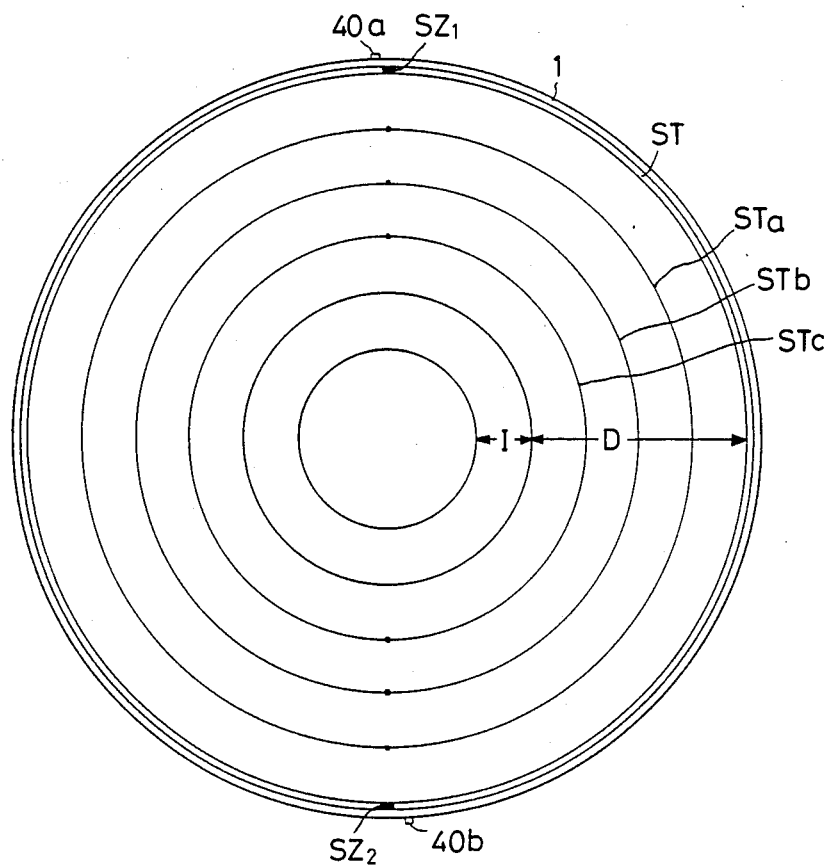

FIGS. 18 and 19 show an arrangement in which the number of the second servo tracks in one unit is one half of the number of the first servo tracks in one unit, so as to meet a requirement of a higher track density. Such a high density sometimes invites an increased error if an error detected in one step in the second servo tracks ST0 or ST1 of a single track is also used in the other three steps. In this case, while using eight first servo tracks ST1, ST2, ST3, ST4, ST5, ST6, ST7 and ST8 for 8 steps respectively, four second servo tracks ST01, ST02, ST03, and ST04 corresponding to exciting phases in a half cycle are provided, so that second servo tracks are used for seeking correcting information therefrom for associated first servo tracks in combination of ST01 with ST1 and ST5, ST02 with ST2 and ST6, ST03 with ST3 and ST7, and ST04 with ST4 and ST8, in order to renew the RAM table accordingly. In this fashion, a more accurate servo control is expected than in the aforegoing embodiment.

Concerning these servo track groups in this embodiment, as shown in FIG. 19, the first servo track group ST is located outward of the data zone D, i.e. at the outermost circumferential position of the zero track, whereas second servo track groups STa, STb and STc are provided in three divisions of the data zone D in this sequence from the outermost circumferential portion to the innermost circumferential portion. The reason why the first servo track group ST is located outwardly of the zero track is to increase the data zone D. In this example, it is increased to as much as 10 recording tracks T. The other components and operation of this embodiment are uniform to those of the prior art device and the aforegoing embodiments, and their explanation is omitted here.

[SIXTH EMBODIMENT]

A sixth embodiment is explained below.

The aforegoing first to fifth embodiments employ the following servo correcting method. Predetermined pieces or pairs (one or more) of servo information in a relationship with the interior index signal is provided on a predetermined number of adjacent tracks on an information recording disk which number is, for example, equal to the number of steps corresponding to a half cycle of a stepping motor used as a head transport motor, and the tracks with the servo information are used as servo tracks. On signal writing or reading, the head assembly is moved, when desired, from a recording track for writing or reading to a servo track to read the servo information. The detected servo information controls a driving voltage for supply to the head assembly transport motor to precisely locate the head assembly at the fine track position of the servo track. After this, the head assembly is returned to its original recording track, and precisely located at the fine track position therein according to the information concerning the fine track position in the servo track. In this fashion, the fine track position within a desired extent is always established on signal writing or reading.

On the other hand, as an interface against a controller of the disk driving device, an interface called "ST-506 compatible" is widely used in combination with a magnetic disk employing a floppy-like format. The floppy-like format is a configuration in which one index is provided in one cycle of one track, the region from one index to another is divided into a number of sectors to deal with data, gaps are provided between the sectors and between each sector and each index, and the gap between the final sector and index is longer than the other gaps and used to absorb rotational changes.

The ST-506 interface does not include any means to notify the disk driving device whether the controller reads or not a data signal supplied from the disk driving device. Therefore, if the disk driving device moves the magnetic head to a servo track to perform a predetermined positional control during signal reading, it is sometimes deemed to be an error in the controller. In other words, when signal reading is effected by movement from one track to another, the head assembly is moved to a servo track for positional correction while seeking from one track to another, and after it moved to the latter track, a seek complete signal indicating termination of the seeking operation is supplied. After the seek complete signal is received, the signal reading is commenced. Therefore, even if it is an instruction of the disk driving device, the controller never judges it to be an error. However, if the disk driving device supplies a servo instruction and causes the head seeking in a servo track while signal reading is continuously effected in a single track, the controller often judges it to be an error because the controller does not receive any read data which should be supplied.

The sixth embodiment is proposed in the aforegoing technical background, and aims to establish a method of head position control using servo tracks in which servo control is effected according to a servo instruction from the disk driving device also in the use of the ST-506 interface, and servo control is never unable upon an erroneous judgement of the controller.

The head position control method in a recording medium driving device in which a head assembly writes or reads signals on recording tracks on an information recording medium comprises: forming servo tracks with servo information written thereon at predetermined track positions on the information recording medium; moving the head assembly from a recording track to a servo track to read the servo information on the servo track when a reading operation is continuously effected in a single track; subsequently returning the head assembly to the recording track preceding the movement; precisely locating track according to the detected servo information; and succeedingly returning the head assembly from the final gap position to the reading operation preceding the movement.

The sixth embodiment is described below, referring to the drawings.

Figure 20:
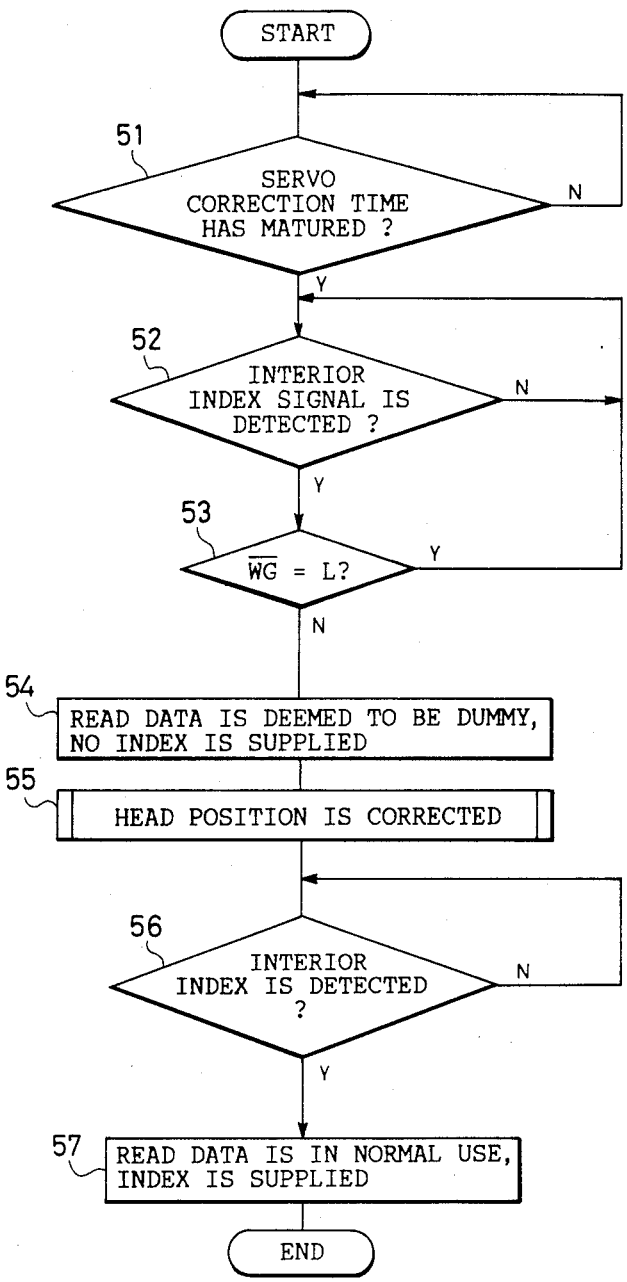
Figure 21:
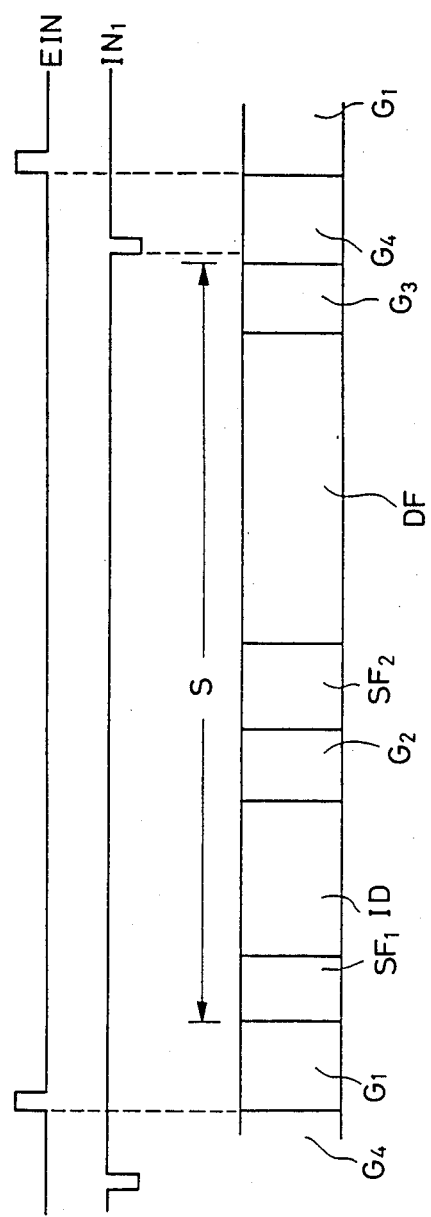

FIGS. 20 and 21 are views for explanation of a head position control method in a disk driving device according to the sixth embodiment, in which FIG. 20 is a flow chart showing the process of seeking and head position correction using the final gap, and FIG. 21 is a view for explanation of a track format. This embodiment uses control system equal to the block diagram of FIG. 1, a relationship between recording tracks on the magnetic disk and the writing configuration of servo signals equal to the explanatory view of FIG. 5, regions on the magnetic disk equal to the explanatory view of FIG. 6, and a servo circuit equal to the block diagram of FIG. 4. Also, the disk driving device itself is equal to the prior art device of FIG. 27. Therefore, redundant explanation of these equal members is omitted here. Parts or members which are or may be deemed to be equal to those of the prior art device are designated by the same reference numerals.

FIG. 21 shows an exemplary format in which the portion from a first gap G1 to a fourth gap G4 is divided into 32 sectors in correspondence to the exterior index signal EIN shown in FIG. 5.

The first gap G1 is used to absorb a deviation of the exterior index signal EIN, and provided with "4E" written thereon at 16 byte unit. A sync field (VFO Sync Field) subsequent to the first gap G1 is used to lock the VFO (PLO) of the controller prior to an address search. Data digits are all zero, i.e. the data merely consist of clocks. In an ID field subsequent to the sync field are written check codes of an address mark, cylinder, head, sector and its region. A second gap G2 subsequent to the ID field ID is called "write space gap" and used for signal writing on a data field DF. The head is changed from its reading mode to its writing mode therein with respect to the data field DF. Therefore, the second gap G2 provides the switching time. A sync field SF2 subsequent to the second gap G2 has the substantially same function as the first sync field SF1 preceding the ID field ID. However, the content of the sync field SF2 is renewed concurrently with renewal of the subsequent data field DF. In this data field DF, data is written. A third gap G3 is provided subsequent to the data field DF. The third gap G3 is called "inter-record gap" as a predetermined length because there is a possibility of destructing a subsequent sector S during a writing operation in a sector S due to changes in the revolution of the DD motor 3. The region from the leading sync field of the ID field ID to the third gap G3 forms one of the 32 sectors. A final, fourth gap G4 is provided subsequently to the third gap G3 at the 32nd sector from the first gap G1, and is provided with a predetermined signal to provide a length of the fourth gap G up to detection of an exterior index signal EIN. The fourth gap G4 changes with velocity of the DD motor 3 and is called "speed tolerance gap".

The fourth gap G4 is 352 bytes in the most traditional aforegoing format of 256 bytes×32 sectors, and occupies about 4.1% of all the bytes. Practically, the length of the byte changes with velocity of the DD motor 3, only a limited region near the first gap G1 is used for servo control seeking.

The rotating angle of a pulse generating magnet 40 attached to the rotor of the DD motor 3 is detected by a Hall element or other magnetic detection means, and used as a first interior index signal IN1. The exterior index signal EIN corresponding to the first gap G1 is supplied when a predetermined number is counted after the detection of the first interior index signal IN1. That is, the exterior index signal EIN is applied to the host computer 26 when the aforegoing count number is detected from detection of the interior index signal, and the position represents the beginning of the recording tracks T.

With this arrangement, the disk driving device operates as follows.

Since the servo control method itself is substantially equal to those of the aforegoing embodiments, the following explanation is limited to specific features of this embodiment.

When the magnetic head 2 traces a single recording track, the magnetic disk is expanded radially outwardly due to an increased temperature. Therefore, the magnetic head, although once taking a precise fine track position, deviates from the recording track 1 on the magnetic disk 1, and causes an off-track problem. In this case, the sixth embodiment is configured to generate a servo instruction from the driving circuit 22 according to the flow chart of FIG. 20. More specifically, when a predetermined time has passed, it is judged in a first step 51 whether a servo correcting time has matured or not. If the judgement is positive, it is judged in a second step 52 whether a first index signal IN1 provided at a position corresponding to the fourth gap G4 as a reference for writing of a servo signal is detected or not.

If the first interior index IN1 is a detected in the second step 52, it goes to a third step 53 which judges the level of a write gate. The write gate takes its on-position at "L" level to establish a writing mode of the disk driving device, and a write current flows. When the write gate takes its off-position, a reading mode is maintained, and if the disk driving device is selected, a read data is supplied. When the write gate is not at "L" level in the third step 53, i.e. when a reading operation is performed, there is no possibility that the controller judges it to be an error. Therefore, it goes to a fourth step 54. In the fourth step 54, the read data is deemed to be a dummy data, and causes the magnetic head 2 to seek a servo track MST1 corresponding to the same exciting phase in the nearest servo track group MST. In a fifth step 55, the same servo control is effected in the servo track MST1 to place the magnetic head 2 at the fine track position of the servo track MST1.

When the positional correction of the magnetic head 2 in the servo track MST1 is terminated in the fifth step 55, it goes to a sixth step 56. The sixth step 56 is provided to obtain a chance of returning the magnetic head 2 to its original track T1 to resume signal reading. When the fifth step 55 is completed, the magnetic head 2 is placed at the fine track position of the original recording track T1 according to the positional correction data in the servo track, and waits for detection of the first interior index IN1. When the first interior index IN1 is detected, the read data is used as the normal data from the recording track T1, and the exterior index EIN is transmitted to the controller 25 a predetermined time after detection of the first interior index IN1. This is a seventh step 57 to establish a normal recording or reproducing operation after the magnetic head 2 returns to the recording track T1. On termination of the seventh step 57, the positional correction of the magnetic head 2 using the fourth gap G4 is completed.

As described, according to the embodiment, also in the use of an interface such as ST-506 interface not including any means of notifying the disk driving device whether the controller reads the read data from the disk driving device or not, the device never fails to effect the positional control of the magnetic head 2 under the servo control temporarily moving it to the servo track according to an instruction from the driving circuit of the disk driving device, controller or host computer.

The aforegoing embodiment is configured to change the read data to a dummy data in the fourth step 54 to never produce the exterior index EIN. However, the same operation is obtained by inactivating a seek complete signal instead of prohibiting the exterior index EIN. More specifically, servo tracks having servo information written thereon may be formed on the recording medium independently from the recording tracks so that the head assembly is moved from the recording track to the servo track in the last gap with no data written thereon. In this fashion, the magnetic head can move away from the recording track, not causing an erroneous judgement of the controller. In the servo track, the head obtains the servo information, and is returned to its original recording track in which it is placed at the fine track position according to the servo information. After this, when the head is placed at the final gap (this may be detected, using the interior index, for example), the magnetic head is returned to the reading condition preceding the movement. Meanwhile, since the controller is not in a normal control condition for reading the read data, it never judges it to be an error regardless of absence of an effective read data. When the read data is used as a normal data, the head takes normal steps via the exterior index and first gap, and error judgement never occurs. During a seeking of the head on a servo track, a follow-up problem of a data separator and an error caused by erroneous reading of the controller are prevented by sending a dummy data to the controller and not sending any index pulse to the controller or inactivating a seek complete signal. In this fashion, a time-out of the controller (error check in absence of data within a predetermined time) is avoided.

According to the sixth embodiment in which the read data is returned from dummy to normal use in the final gap between the final sector and the first gap upon seeking movement of the head from a recording track to a servo track or vice versa, the following results are obtained.

Since the seeking motion is effected in the final gap with no read data written thereon, the controller never judges it to be an error regardless of absence of read data. Therefore, also when the head continuously traces a single recording track, its positional correction is effected by an instruction from the disk driving device.

Due to this, in all cases, the system never fails to control the head position, using servo tracks and with no worry about errors.

Further, since widely used interface such as ST-506 may be used, an interchangeability is established between a disk driving device using servo tracks to correct the head position and other disk driving device using other servo control system.

[SEVENTH EMBODIMENT]

A seventh embodiment of the invention is described below.

The head position control method related to the disk driving devices described in the aforegoing first to sixth embodiments are directed to a case where the disk driving device is in a specific operating condition, and no consideration was entered about a general head position control system of the entire disk driving device commencing from power supply to the system.

The seventh embodiment relates to an entire system control indispensable in activation of the disk driving device, and includes the aforegoing head position control.

The head position control method according to the seventh embodiment is directed to an information recording disk driving device including: an information recording disk having an information recording layer thereon; a housing supporting the information recording disk therein; a rotation means supported in the housing to rotate the information recording disk; a head assembly opposed to the information recording layer of the information recording disk movably along the surface of the disk to effect signal writing and reading from and on the information recording layer; a head transport means supporting the head assembly and moving it along the surface of the information recording disk; a driving means driving the information recording head transport means; and servo tracks provided at some predetermined regions on the information recording disk and provided with servo information written thereon, and the head position control method comprises: a first control step to confirm whether a step signal is entered or not from a host computer; a second control step to confirm whether the head assembly remains on a single recording track and a counter counts a predetermined number when no step signal is recognized in the first control step, said second control step returning to the first control step when the counter does not count the predetermined number; a third control step to move the head assembly from a recording track to an associated servo track when the counter counts the predetermined number, said third step fixing the head assembly at a position in the servo track and thereafter returning the head assembly to its original recording track by activating the driving means and fixing the head assembly at the fine track position in the recording track, so as to resume the first control step; a fourth step to confirm whether a counter of a servo track associated with a recording track corresponding to the number of steps of a step signal counts a predetermined number or not when the first step confirms reception of the step signal; a fifth control step to move the head assembly to a servo track associated with a recording track before moving it to the recording track corresponding to the step signal when the counter of the servo track counts the predetermined number, to fix the head assembly at a position in the servo track, and thereafter move the head assembly to the recording track corresponding to the step signal by activating the drive means to fix at a proper position therein according to information regarding the positional fixture in the servo track; and a sixth step to move the head assembly to the recording track corresponding to the step signal when the counter of the servo track does not count the predetermined number, so as to resume the first control step.

The seventh embodiment is hereinbelow described, referring to the drawings.

Figure 22:
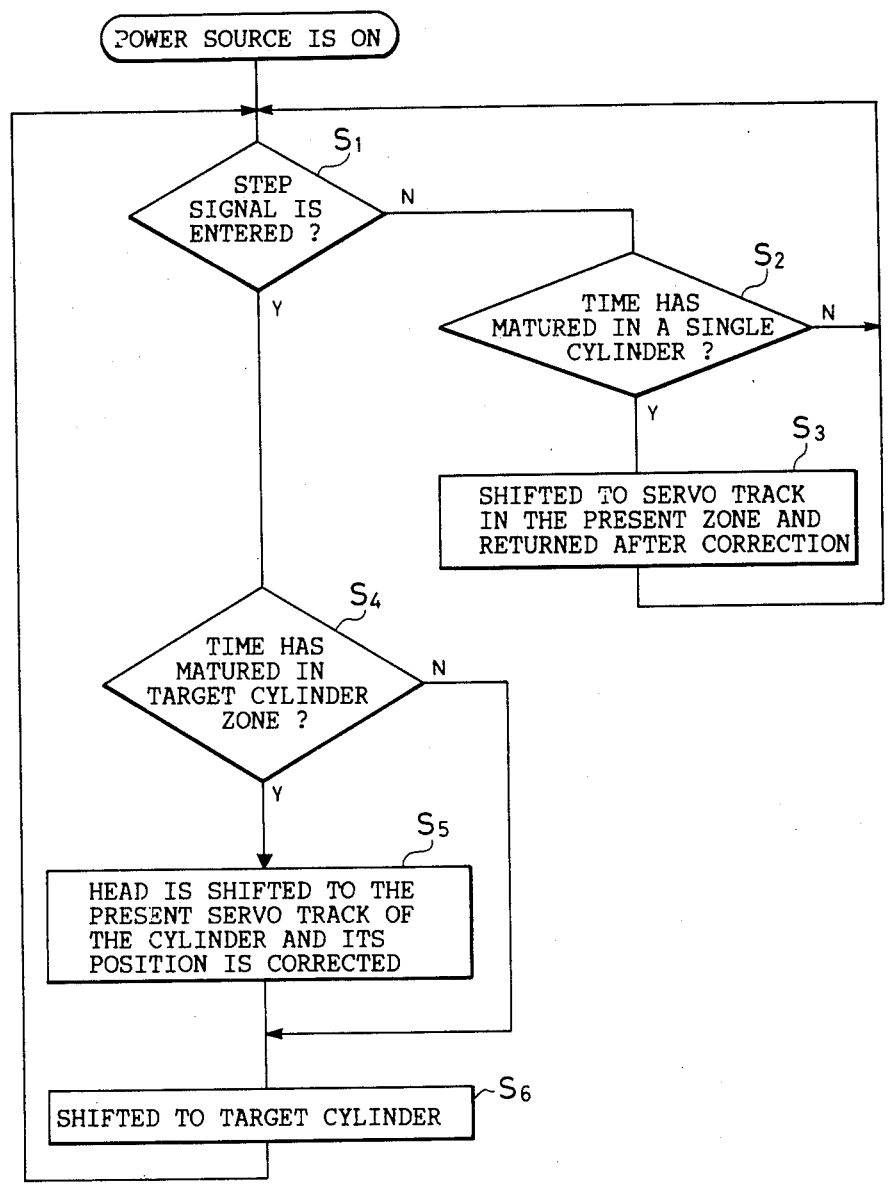
Figure 23:
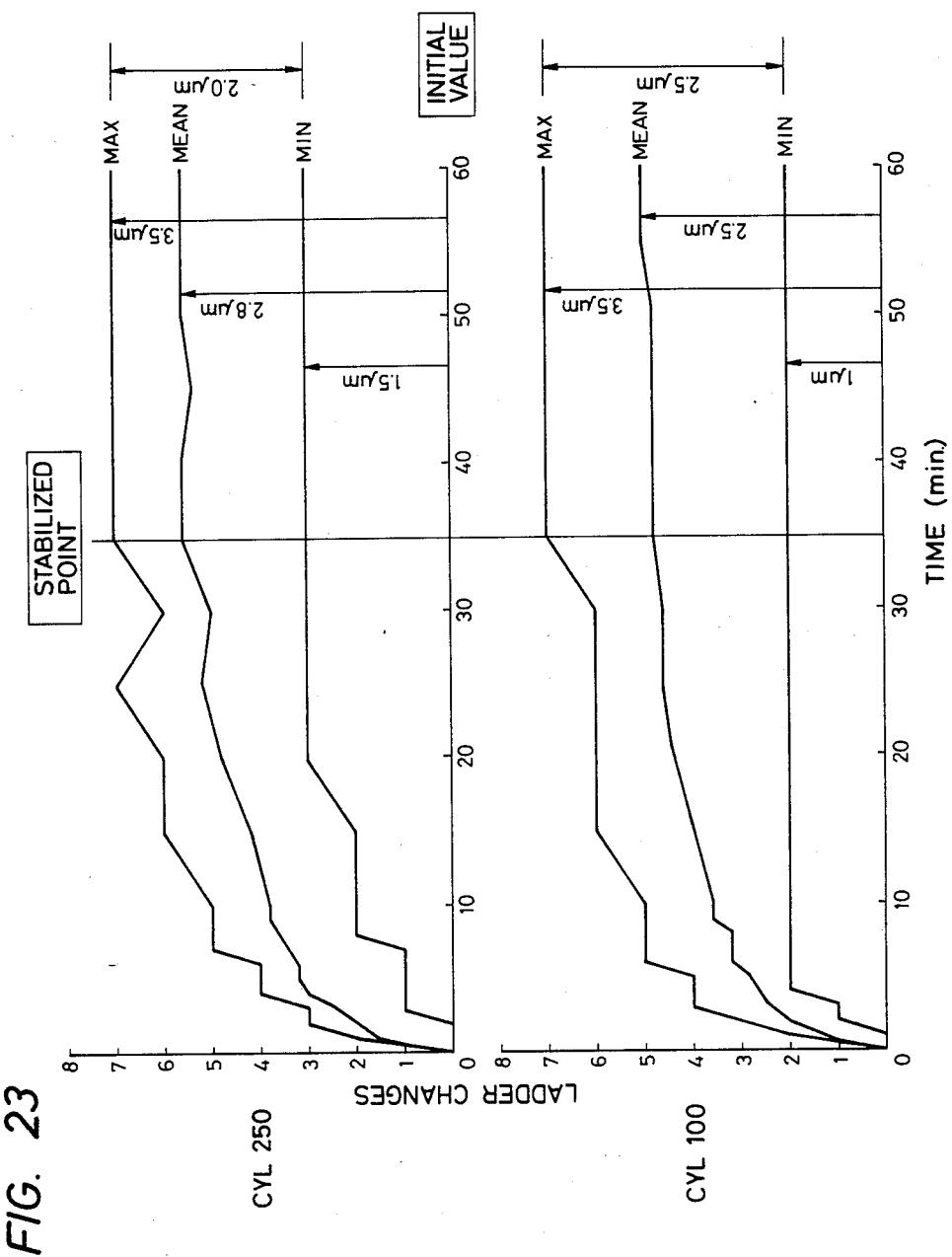
Figure 24:
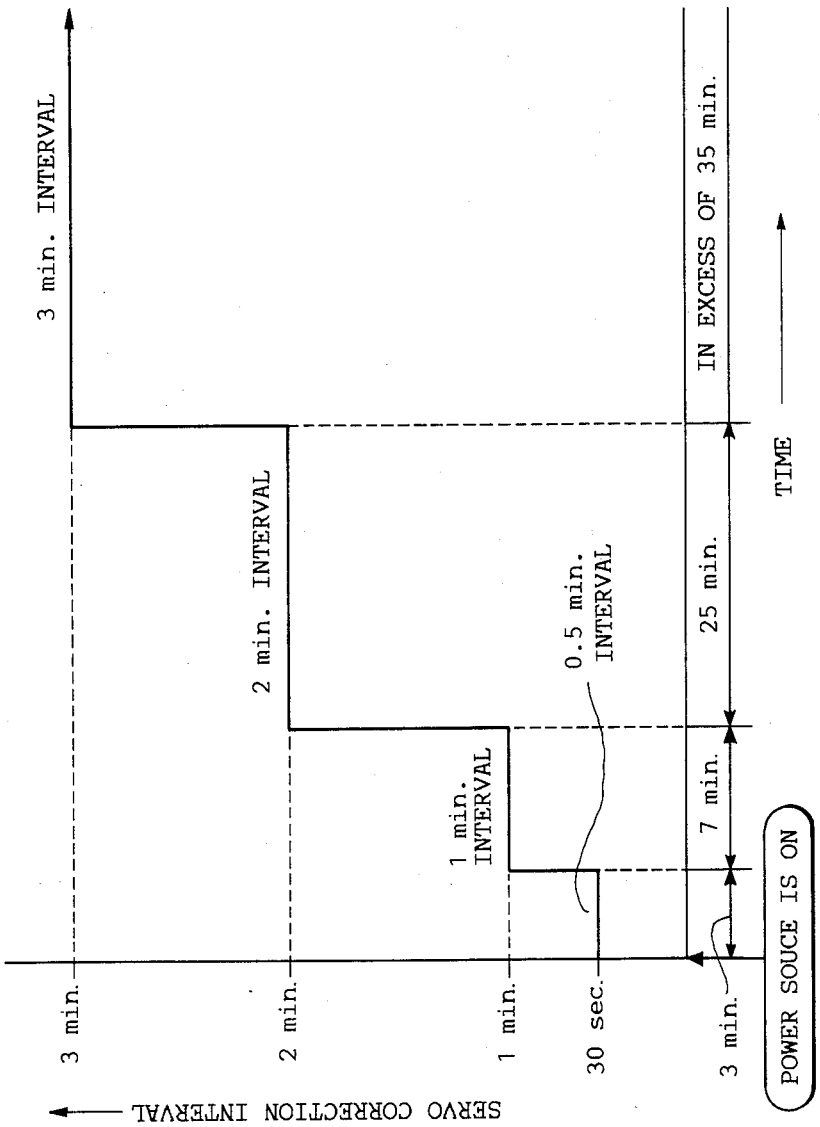

FIGS. 22 through 24 are views for explanation of the head position control method proposed by the seventh embodiment, in which FIG. 22 is a flow chart showing a servo algorithm employed in the disk driving device related to the embodiment, FIG. 23 shows real experimental amounts of thermal off-track, and FIG. 24 is an explanatory view showing servo correction intervals. The disk driving device itself is uniform to the prior art device shown in FIG. 27, and uses the same servo patterns and servo regions as those of the embodiment of FIG. 4. Therefore, their explanation is omitted here.

FIG. 22 shows a servo algorithm of a process to correct a deviation of the head assembly from the fine track position caused by an increase in the temperature (normally called "thermal off-track") immediately after rotation of the disk is commenced.

As shown in FIG. 23, the thermal off-track gradually increases immediately after a power supply to the device, and reaches substantially constant value in about 35 minutes. This is an experimental result obtained by five samples at room temperature of 23° C.

Figure 27:
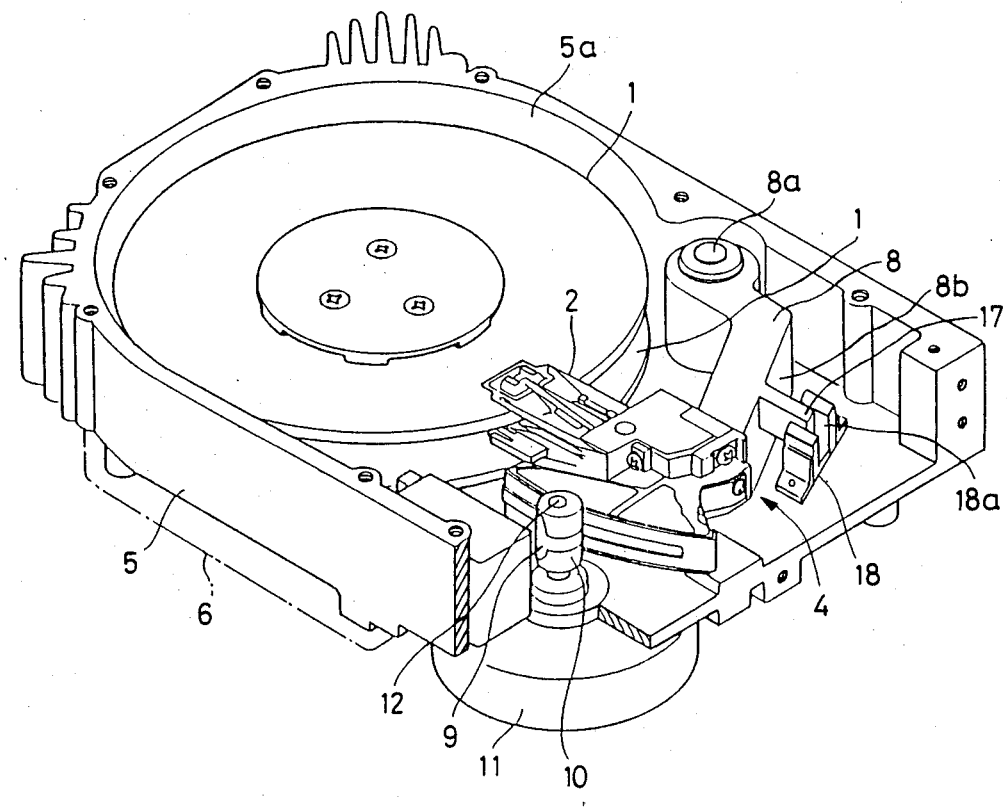
FIG. 27 is a fragmentary perspective view of a disk driving device of the prior art and the aforegoing embodiments in which the device is partly cut out.

When a power is supplied to the disk driving device of FIGS. 27 and 1, the DD motor 3 begins to rotate, and the magnetic disk 1 rotates accordingly. With this rotation, the magnetic head 2 floats at the radially innermost inhibit zone I, once moves to the radially outermost zero track to confirm the track position, and thereafter moves to an instructed recording track T. During this, a thermal off-track occurs as shown in FIG. 23. Therefore, the driving circuit 22 produces servo correction instructing signals at a predetermined interval. In this connection, a first control step $S_1$ is provided in the driving circuit 22 to confirm whether a step signal is entered or not from the host computer 26 or controller 25. When reception of a step signal is not recognized in the first control step, a second control step $S_2$ follows in which the duration of stay of the magnetic head 2 in a single track, i.e. a single cylinder is detected by a counter for measuring the time in the driving device 22. When the counter does not count a predetermined time in the single cylinder, i.e. when the head assembly stays in the single cylinder for a time shorter than a predetermined time, the head assembly is returned to the first control step $S_1$ to effect signal writing or reading on the same cylinder.

When the counter has counted a predetermined time on a single cylinder in the second control step $S_2$, there is a great possibility of off-track. Therefore, the driving circuit 22 instructs to effect a servo control, and moves the magnetic head 2 to a servo track ST corresponding to the cylinder (third step $S_3$). Subsequently, servo information on the servo track ST is used to place the head 2 at the fine track position in the servo track ST. After this, the head 2 is returned to the preceding cylinder and is placed at the fine track position on the cylinder by the aforegoing servo control based on information regarding the preceding positional fixture in the servo track. That is, the first control step $S_1$ is resumed.

When step signal is recognized in the first control step $S_1$, namely when an instruction to move the head to any other recording track T is received from the host computer 26, a fourth control step $S_4$ follows. The fourth control step $S_4$ is provided to confirm whether a counter of a servo T zone associated with an instructed recording track T counts a predetermined time or not. If the counter has counted the predetermined time, a fifth control step $S_5$ follows, whereas if the predetermined time was not counted, a fifth control step $S_6$ follows.

More specifically, when the predetermined time is counted in the fourth control step $S_4$, the head 2 is not directly moved to the cylinder instructed by the host computer, but moved to a servo track ST in a servo zone associated with the instructed cylinder. Here, the head 2 is placed at the fine track position in the servo track in the same manner as described above (fifth control step $S_5$), and a sixth control step follows in which the head 2 is moved to the instructed cylinder and placed at the fine track position therein according to the information concerning the preceding positional fixture in the servo track.

On the other hand, when the predetermined time was not counted in the fourth control step $S_4$, the head 2 is directly moved to the instructed cylinder corresponding to the number indicated by the step signal from the host computer 26 to effect signal writing or reading on the magnetic disk 1 until a subsequent step signal is entered (sixth control step $S_6$). These first to sixth control steps $S_1$ through $S_6$ are repeated under a time control to effectively perform the desired servo correction.

More specifically, in the servo algorythm proposed by the seventh embodiment, in response to reception of a step signal and the stay time of the head in a single track or in a zone associated with a desired track, the head is moved from a present track to a servo track in an associated servo zone and placed at the fine track position in the servo track to obtain positional information to subsequently place the head at the fine track position in the original recording track, or alternatively, when the predetermined time for servo correction has matured before the head is moved to other instructed recording track, the head is first moved to a servo track to read servo information thereon to fix the position of the head therein accordingly, and subsequently moved to the instructed track and placed at the fine track position therein according to the servo information. In other words, the servo algorythm changes its servo correction between a case where the head stays in a single track and a case where the head is to be moved to other instructed track, according to presence or absence of a step signal in a predetermined time for servo correction, so as to never fail to establish the servo correction of the proper head position with respect to a desired track in any track position or any reproducing condition in the track.

Hereinbelow, servo information detection and RAM table renewal in the third and fifth control steps $S_3$ and $S_5$ are explained in detail.

The third and fifth control steps $S_3$ and $S_5$ are provided to detect servo information for servo correction of the magnetic head 2 and to find the fine track position for the head 2. In these steps, the magnetic head 2 may move in either the radially inward or radially outward direction of the magnetic disk 1. In these two directional movements, the current value applied to exciting phases of the stepping motor 11 is changed a little. In this connection, eight RAM tables are provided in total for opposite directions of four heads opposed to opposite surfaces of two magnetic disks 1, so that when a head changing signal is produced, one of the RAM tables is immediately replaced by a corresponding one, and a servo correction is effected according to the information stored in the latter RAM table.

However, the use of RAM tables for individual directions not only increases the number of RAM tables but also elongates the time for renewal and prevents an improvement of the total seeking speed. Therefore, there still exists room for improvement.

As a result of an analyzation of the exciting current of the stepping motor in individual directions and deviations in the position of the head, it has been recognized that the exciting current for one direction is obtained by subtracting or adding a fixed value for the outstanding servo track to the exciting current for the other direction. Therefore, when a RAM table for one direction is prepared, the control current to an exciting phase of the stepping motor for movement in the other direction is determined by adding or subtracting a predetermined value for the servo track to or from the value stored in the present RAM table.

With this arrangement, upon a renewal of the RAM table by obtaining servo information and storing the control current which defines the center position of the outstanding track, a renewal for one direction results in a renewal for the other direction. This contributes to a reduction of the renewal time and omission of RAM tables for the other directions. It should be noted, however, that the renewal of the RAM table must be always effected from one direction.

The number of servo tracks ST in a single servo zone is considered to be contented with the number corresponding to one half cycle of the stepping motor 11, in its relationship with the exciting phases of the motor 11. However, as described in the fifth embodiment, some disks having a high track density are sometimes provided with servo tracks for one cycle, e.g. eight servo tracks ST. In this case, it takes much time to renew all the eight tracks. Therefore, eight tracks may be divided into two groups, i.e. former half four steps and latter half four steps in correspondence with exciting phases of the stepping motor 11, so that only the former four steps are renewed when the magnetic head 2 is placed in the former half exciting phase region of the stepping motor 11, and only the latter half four steps are renewed when the magnetic head 2 is placed in the latter half exciting phase region. Thereby, the renewal time is reduced.

Renewal of the RAM tables are effected upon servo corrections which in turn are effected in a relationship with respective thermal off-track amounts. More specifically, as shown also in FIG. 23, distances among respective cylinders expand due to thermal expansion immediately after power supply to the device. Considering the expansion ratio, this embodiment is configured as shown in FIG. 24 in which servo correction is effected at 30 second intervals within three minutes after the power supply, at one minute intervals from three to ten minutes, at two minute intervals from 10 to 35 minutes, and at three minute intervals beyond 35 minutes. The time is supervised, using a counter provided in the driving circuit 22.

Figure 25:
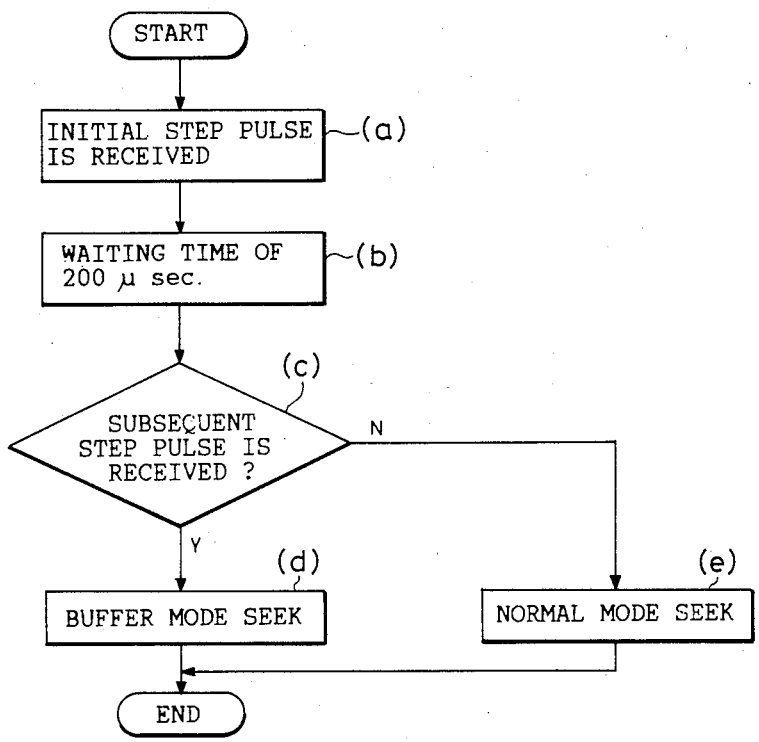

There are two seeking systems of the magnetic head 22 one of which is called "normal mode seek" to move the magnetic head 2 to every track in sequence and the other of which is called "buffer mode seek" to skip the magnetic head 2 to a track beyond several tracks. When a high speed seeking is desired, the latter buffer mode seeking is employed. In this case, the control system shown in the flow chart of FIG. 25 is employed to reduce the settling time.

More specifically, when the stepping motor is driven for the normal mode seeking, the step velocity of the stepping motor is not so high. Therefore, an exciting mode is interposed to move the magnetic head 2 to an intermediate position between a preceding track (N-1) and the subsequent desired track N.

In the buffer mode seeking, however, the step speed of the stepping motor is increased so much that an overshoot of the stepping motor cannot be prevented merely by interposing only one exciting mode to move the magnetic head to the intermediate position between the preceding track (N-1) and the subsequent desired track N.

In this connection, since the total stepping number in the buffer mode seeking is originally known, exciting modes are interposed at intermediate positions between respective adjacent steps preceding a desired track N. In this fashion, the stepping motor seldom causes such an overshoot, and reliably drives the magnetic head to a desired track N in a short time. The buffer mode seeking is hereinbelow described in detail.

First of all, it is necessary to judge whether the stepping motor is activated for the buffer mode seeking or the normal mode seeking. In the buffer mode seeking, a number of step pulses are supplied at a short time interval.

In this connection, as shown in FIG. 25, after reception (a) of the first step pulse, a waiting time (b) is provided to count 200 μsec. from the reception (a), so as to judge (c) whether a subsequent step pulse is received within the waiting time. If a subsequent step pulse is received, the system recognizes that the seeking mode is the buffer mode (d), whereas if no subsequent pulse is received, the system recognizes that the seeking mode is the normal mode (e).

Figure 26:
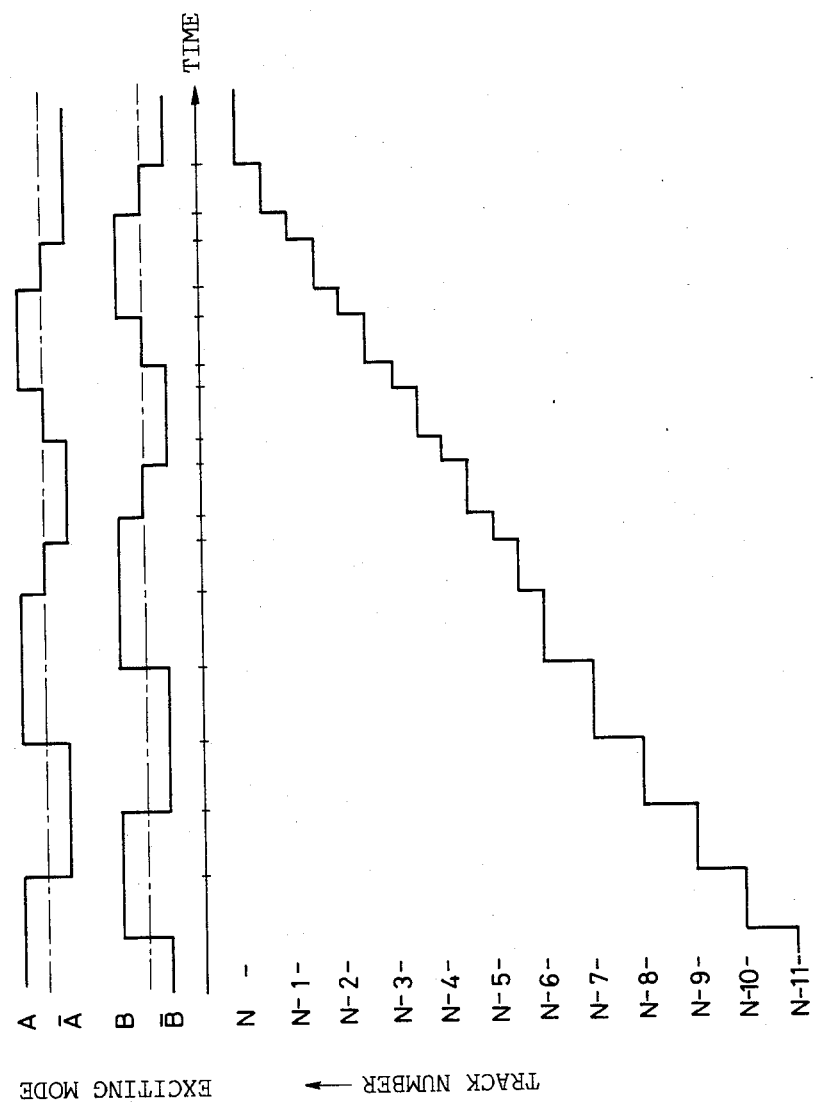

When the buffer mode seeking is recognized, since the total stepping number is originally known, exciting modes are interposed to move the magnetic head 2 to intermediate positions between respective adjacent steps, e.g. six steps preceding a desired track N as shown in FIG. 26, to suppress the stepping velocity. A more detailed explanation follows, referring to FIG. 26. Before the head reaches a track (N-6) which is sixth step before a desired track N, a driving current is applied to two-phase exciting coils of the stepping motor as in the prior art driving fashion, to sequentially change the exciting mode of the stepping motor to move the head to respective tracks.

Figure 28:
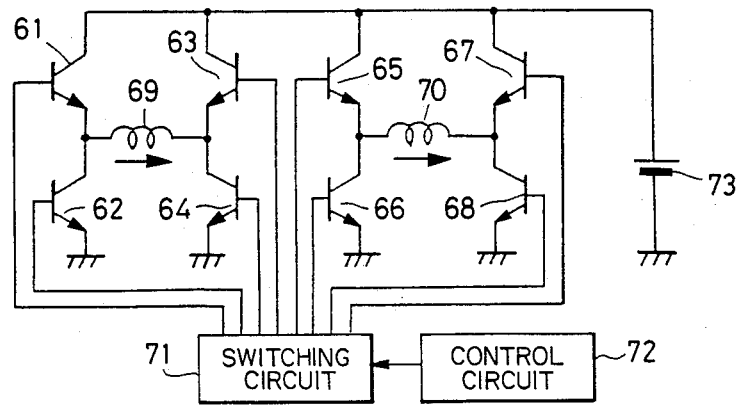
FIG. 28, is a circuit diagram also used in the prior art to control the stepping motor.

In this connection, a driving control fashion of a prior art two-phase bipolar stepping motor is explained, referring to FIG. 28. Reference numeral 61 through 68 refer to exciting mode changing transistors, 69 and 70 to first and second exciting coils of the stepping motor, 71 to an exciting mode switching circuit to selectively supply a driving current to the exciting coils 69 and 70, 72 to a control circuit to control the exciting mode switching circuit 71, and 73 to a d.c. power source.

With this arrangement, the exciting mode switching circuit 71 is responsive to a signal from the control circuit 72 to selectively establish conduction or non-conduction of the transistors 61 through 68 so that the direction of the driving current to the two-phase first and second exciting coils 69 and 70 is changed to sequentially change the exciting mode.

A specific example is introduced here for a better explanation. The transistors 61, 64, 65 and 68 are rendered conductive, with the other transistors 62, 63, 66 and 67 being non-conductive, and a driving current in arrow-marked directions is simultaneously applied to the first and second exciting coils 69 and 70 to establish a two-phase exciting mode, i.e. AB mode.

Subsequently, the transistors 62, 63, 65 and 68 are rendered conductive, with the other transistors 61, 64, 66 and 67 being non-conductive, a driving current in the counter-arrow direction is applied to the first exciting coil 69 whereas a driving current in the arrow-marked direction is applied to the second exciting coil 70, to thereby establish the $\overline{A}B$ mode. Further, transistors 62, 63, 66 and 67 are rendered conductive, with the other transistors 61, 64, 65 and 68 being non-conductive, and a current in the counter-arrow directions is applied to the first and second exciting coils 69 and 70 to establish the $\overline{AB}$ mode. After this, transistors 61, 64, 66 and 67 are rendered conductive, with the other transistors 62, 63, 65 and 67 being non-conductive, and a driving current in the arrow direction is applied to the first exciting coil 69 whereas a driving current in the counter-arrow direction is applied to the second exciting coil 70, to thereby establish the $A\overline{B}$ mode.

In this fashion, the stepping motor is rotated by sequentially changing two-phase exciting modes from AB, $\overline{A}B$, $\overline{AB}$ to $A\overline{B}$ under selective conduction and non-conduction of the transistors 61 through 68 via the exciting mode switching circuit 71. Further, the stepping motor is rotated in the opposite direction by the opposite changing sequence of the exciting modes from $A\overline{B}$, $\overline{AB}$, $\overline{A}B$ to AB under the opposite sequence of conduction and non-conduction of the transistors 61 through 68 established by the exciting mode switching circuit 71 in response to a signal from the control circuit 72.

The stepping mode is rotated by sequential switching of the exciting mode until the magnetic head reaches a desired track, and on arrival at the desired track, the present exciting mode is maintained, and the stepping motor is inactivated.

Therefore, also in this embodiment, when the head reaches the track (N-6), the exciting mode is changed from the AB mode of the track (N-6) to the $\overline{A}B$ mode of the track (N-5) via A mode of one-phase excitation in which the first exciting coil 69 is merely provided with the driving current. Further, the exciting mode is changed from the $\overline{A}B$ mode of the track (N-5) to the $\overline{AB}$ mode of the track (N-4) via the $\overline{A}$ mode. Similarly, in movement from the track (N-4) to the track (N-3), the mode is changed from $\overline{AB}$ to $A\overline{B}$ via B mode, and in movement from the track (N-3) to the track (N-2), the $A\overline{B}$ mode is replaced by the AB mode via A mode. Also, in movement from the track (N-2) to the track (N-1), the AB mode is replaced by the $\overline{A}B$ mode via B mode, and in the final step from the track (N-1) to the desired track N, the $\overline{A}B$ mode is replaced by the $\overline{AB}$ mode via $\overline{A}$ mode.

In this case, the interval for changing one exciting mode of a track to another exciting mode of a subsequent track and the duration of an exciting mode for controllably rotating the stepping motor to an intermediate position of adjacent tracks are adequately selected in accordance with the inertia of the stepping motor and other factors.

The use of the aforegoing controllable activation of the stepping motor 11 contributes to a significant decrease of the overshoot caused by the inertia of the stepping motor, magnetic head or others. This enables a remarkable reduction of the settling time and the entire seeking time.

What is claimed is:

1. In a head position control method for positioning a head assembly at a fine track position of a recording track in an information recording disk driving device including: an information recording disk having information recording layers on surfaces thereof; a housing accepting said information recording disk therein; a rotary means supported by said housing to rotate said information recording disk; head assemblies opposed to said information recording layers and supported movably along said surfaces of the information recording disk to write or read signals on or from said information recording layers; a head transport means supporting said head assemblies to move them along the surfaces of the information recording disk; and a driving means activating said head transport means, said information recording disk having servo tracks formed at some predetermined regions thereof by writing servo information thereon, the method comprising the steps of:

a first control step of confirming whether any step signal is entered or not from a host computer;

a second control step following said first control step in absence of said step signal of confirming whether a counter counts or not a predetermined time while the head assembly stays on a single recording track, and returning back to said first control step when the counter does not count the predetermined time;

a third control step following said second step when the counter has counted the predetermined number, of moving the head assembly from a present recording track to a servo track in an associated region and placing the head assembly at a proper position in the servo track, said head assembly being thereafter moved back to the original recording track and placed at the fine track position therein according to information about the positional fixture in the servo track, said third control step subsequently returning to said first control step;

a fourth control step following said first control step in presence of said step signal of confirming whether a predetermined time is counted or not by a counter associated with a servo track in a predetermined region associated with a recording track corresponding to the step number of the step signal;

a fifth control step following said fourth control step when the predetermined time is counted, of moving the head to a servo track associated with a recording track corresponding to the step signal and placing the head at a proper position of the servo track before moving the head to the recording track, said driving means of the head assembly being subsequently activated to move the head assembly to the recording track corresponding to the step signal and place it at the fine track position of the recording track according to information about the positional fixture in the servo track; and a sixth control step following said fourth control step when the counter does not count the predetermined time, of moving the head assembly directly to the recording track corresponding to the step signal and subsequently returning to said first control step.

2. A head position control method of claim 1 wherein when the counter counts the predetermined time in the second control step, the third step is arranged to move the head assembly from the recording track to a servo track in an associated region at the final gap position following the final sector of the present recording track to read servo information from the servo track, said head assembly being thereafter moved back to the preceding recording track and placed at the fine track position therein according to the detected servo information, said head assembly subsequently resuming its signal reading operation before the movement from the final gap position.

3. A head position control method of claim 1 wherein said predetermined times counted by the counters in the second and fourth control steps are elongated with time from power supply to the device.

* * * * *